US008405862B2

(12) United States Patent
Makishima et al.

(10) Patent No.: US 8,405,862 B2
(45) Date of Patent: Mar. 26, 2013

(54) PRINTING MANAGING APPARATUS, IMAGE FORMING APPARATUS, AND PRINTING MANAGING METHOD

(75) Inventors: Shinji Makishima, Shizuoka-ken (JP); Kazuhiro Ogura, Kanagawa-ken (JP); Akihiro Mizutani, Tokyo-to (JP); Toshihiro Ida, Shizuoka-ken (JP); Yusuke Hamada, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 391 days.

(21) Appl. No.: 12/875,624

(22) Filed: Sep. 3, 2010

(65) Prior Publication Data
US 2011/0102834 A1 May 5, 2011

Related U.S. Application Data

(60) Provisional application No. 61/256,534, filed on Oct. 30, 2009.

(51) Int. Cl.
*G06F 15/00* (2006.01)
*H04L 9/32* (2006.01)

(52) U.S. Cl. ...................... 358/1.15; 713/176

(58) Field of Classification Search ................... 358/1.15
See application file for complete search history.

(56) References Cited

U.S. PATENT DOCUMENTS
6,466,329 B1 * 10/2002 Mukai ..................... 358/1.15

FOREIGN PATENT DOCUMENTS
JP   2003-58629   2/2003

* cited by examiner

*Primary Examiner* — Saeid Ebrahimi Dehkordy
(74) *Attorney, Agent, or Firm* — Turocy & Watson, LLP

(57) ABSTRACT

According to one embodiment, a printing managing apparatus includes a log memory, an allowed amount memory, a counting unit, a calculating unit, and an output unit. The log memory stores, in association with user identification information, information indicating a sheet printed by an image forming apparatus according to an instruction of a user or information indicating a sheet discarded by the user. The allowed amount memory stores allowed amounts of sheets usable by users. The counting unit counts the number of un-discarded sheets among sheets printed by a certain user stored by the log memory. The calculating unit calculates a usage ratio of sheets from the number of un-discarded sheets counted by the counting unit and the allowed amount of sheets for the user stored by the allowed amount memory. The output unit outputs information including the usage ratio of sheets calculated by the calculating unit.

20 Claims, 13 Drawing Sheets

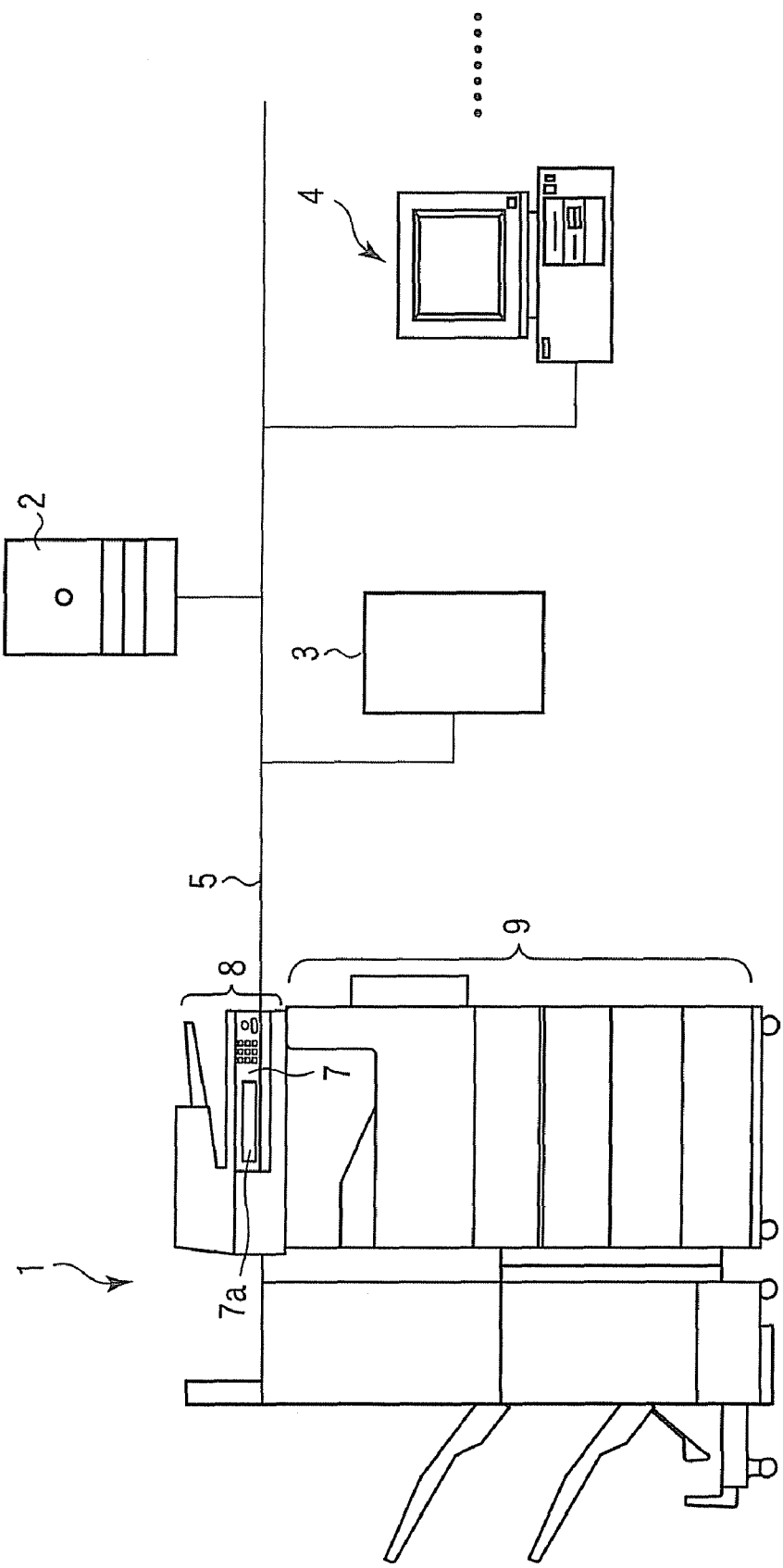
F I G. 1

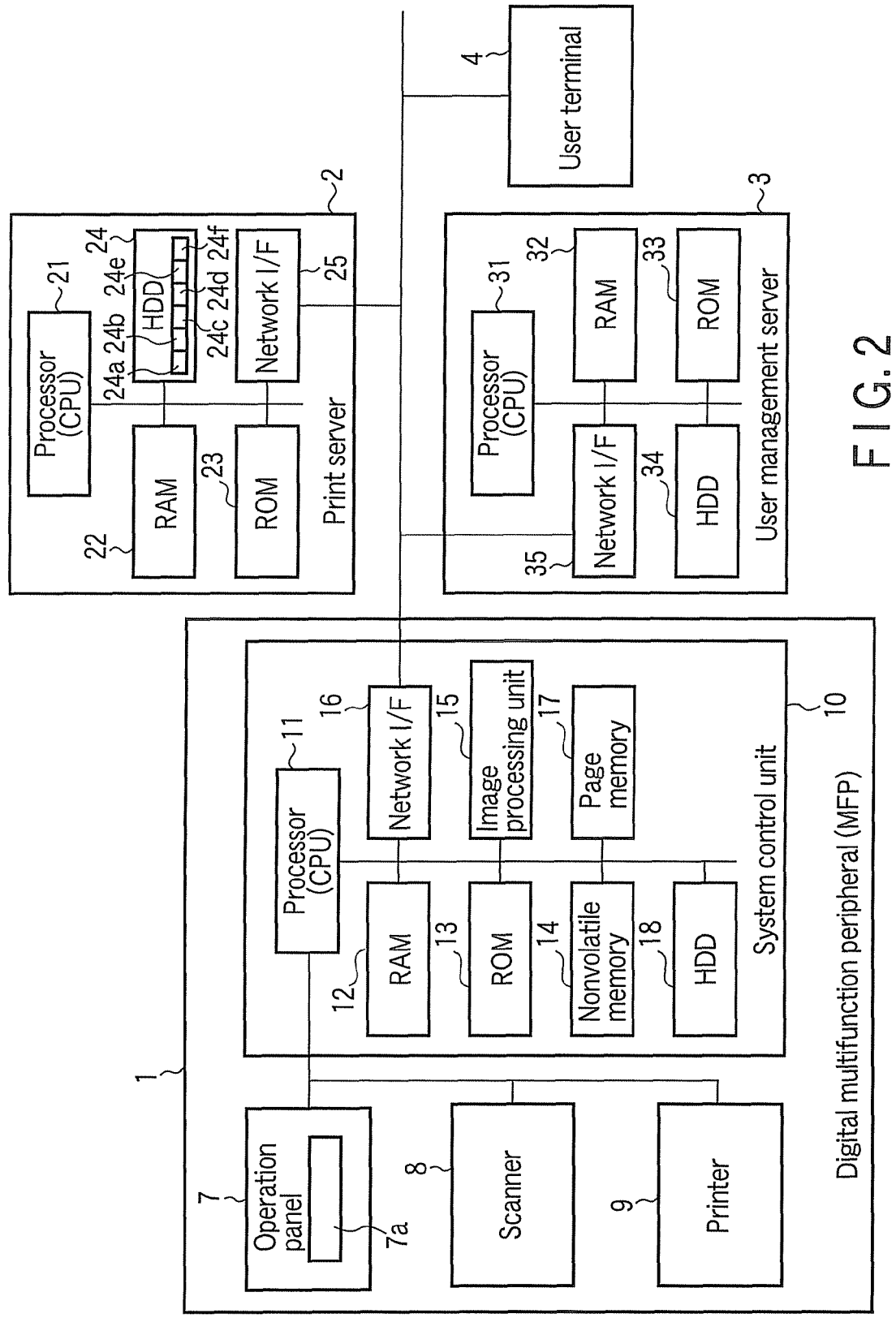
F I G. 2

| Document ID | File name | Number of pages | Original data |
|---|---|---|---|
| 0001 | aaa. txt | 3 | 1101000101··· |
| 0002 | bbb. doc | 5 | 0001001100··· |

| Page ID | Document ID | Page number | Confidentiality level | Expiration date | Output flag |
|---|---|---|---|---|---|
| 000001 | 0001 | 1 | 4 | 2015/3/31 | false |
| 000002 | 0001 | 2 | 4 | 2015/3/31 | false |
| 000003 | 0001 | 3 | 1 | 2008/11/02 | true |
| 000004 | 0002 | 1 | 3 | 2008/9/18 | false |

| Print ID | Print ID of immediately preceding generation | Generation number | Page ID | Discarding flag | User ID |
|---|---|---|---|---|---|
| 000000001 | — | 0 | 000001 | false | 00001 |
| 000000002 | 000000001 | 1 | 000001 | false | 00001 |
| 000000003 | 000000002 | 2 | 000001 | false | 00001 |
| 000000004 | — | 0 | 000002 | true | 00002 |

| Date and time | User ID | Operation | Size | Print ID |
|---|---|---|---|---|
| 2009/09/01 13:23 | 00121 | Copying | A4 | 000004321 |
| 2009/09/10 08:44 | 00122 | Copying | A4 | 000000022 |
| 2009/09/10 20:13 | 00245 | Printing | A3 | 001020003 |
| 2009/09/15 16:49 | 00361 | Discarding | A4 | 000005274 |

FIG. 9 (24f)

| User ID | Sheet used amount | Allowed amount of sheets | Usage ratio(%) |
|---|---|---|---|
| 00001 | 58 | 1,000 | 5.8 |
| 00002 | 682 | 1,000 | 68.2 |
| 00003 | 1045 | 1,000 | 104.5 |
| 00004 | 238 | 1,000 | 23.8 |

FIG. 8 (24e)

| Office allowed amount of sheets | Floor | Allowed amount of sheets by floor | Department | Allowed amount of sheets by area | User ID | Allowed amount of sheets by user |
|---|---|---|---|---|---|---|
| 500,000 | Building A, Third floor | 100,000 | Development | 20,000 | 00121 | 1,000 |
| 500,000 | Building A, Third floor | 100,000 | Development | 20,000 | 00122 | 1,000 |
| 500,000 | Building A, Third floor | 100,000 | Design | 60,000 | 00151 | 1,000 |
| 500,000 | Building A, Third floor | 100,000 | Design | 60,000 | 00152 | 1,000 |
| 500,000 | Building B, First floor | 200,000 | Accounting | 50,000 | 00201 | 1,000 |
| 500,000 | Building B, First floor | 200,000 | Accounting | 50,000 | 00202 | 1,000 |
| 500,000 | Building B, First floor | 200,000 | General affairs | 50,000 | 00221 | 1,000 |
| 500,000 | Building B, First floor | 200,000 | General affairs | 50,000 | 00222 | 1,000 |

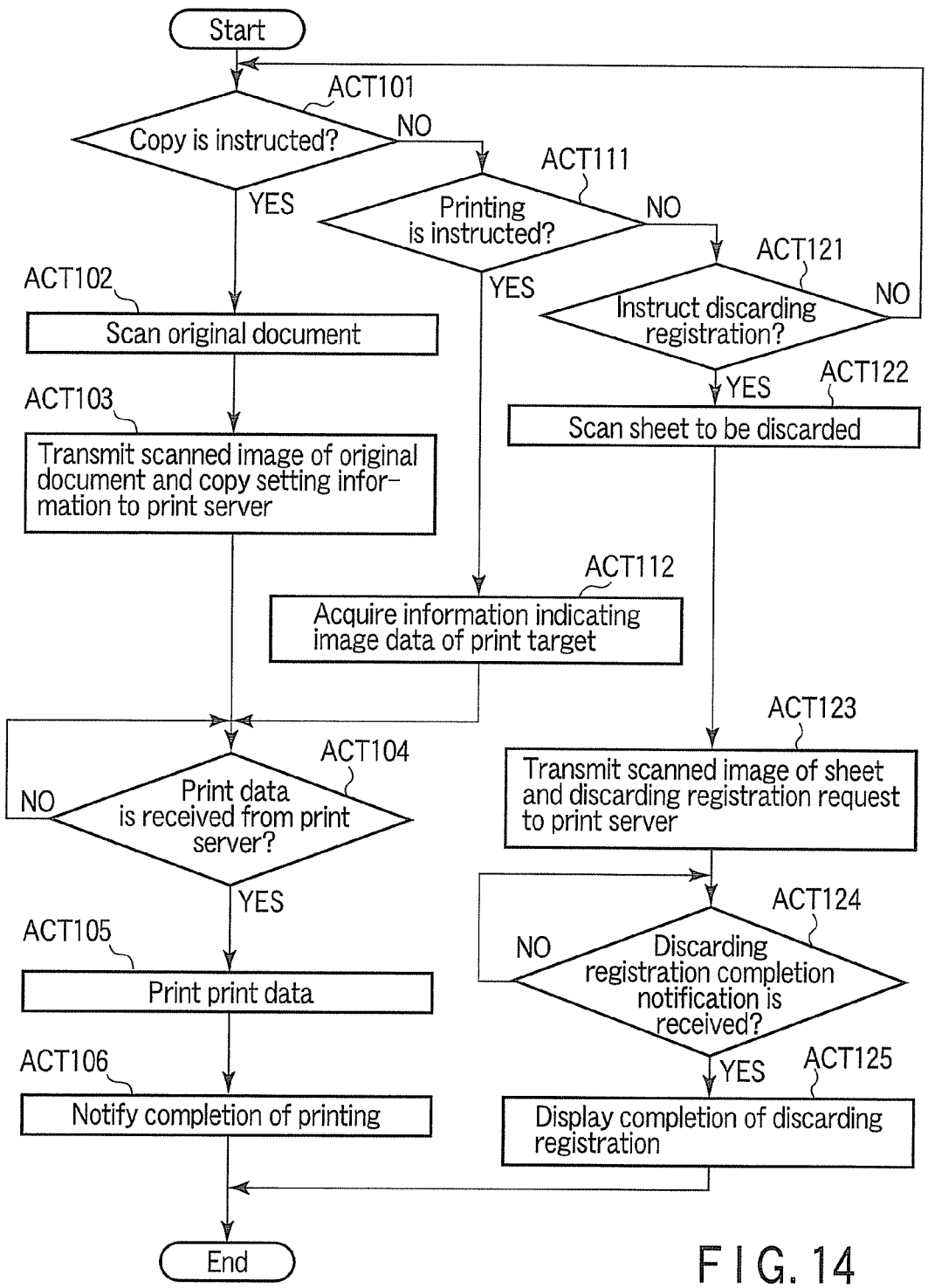
F I G. 14

To : ++++@*.

From : printserver@*.

To user ID 00351

Your usage ratio of sheets exceeds 80%.
Please discard unnecessary sheets.

○ Sheets having close expiration date

| Date and time | Operation | File name | Page number |
|---|---|---|---|
| 2007/07/24 12 : 25 | Copying | ***.pdf | 2/5 |
| 2007/07/24 12 : 25 | Copying | ***.pdf | 5/5 |
| 2008/12/03 19 : 42 | Printing | +++.doc | All pages |

FIG. 19

PRINTING MANAGING APPARATUS, IMAGE FORMING APPARATUS, AND PRINTING MANAGING METHOD

CROSS-REFERENCE TO RELATED APPLICATION

This application is based upon and claims the benefit of priority from U.S. Provisional Application No. 61/256,534 filed on Oct. 30, 2009; the entire contents of which are incorporated herein by reference.

FIELD

Embodiments described herein relate generally to a printing managing apparatus, an image forming apparatus, and a printing managing method.

BACKGROUND

In recent years, in an image forming system, necessity of managing a sheet used as an image formation medium is increasing. For example, from the view point of environment load, security, or the like, there is a demand for an image forming system that can manage a life cycle of a sheet from image formation on the sheet until discarding of the sheet.

BRIEF DESCRIPTION OF THE DRAWINGS

FIG. 1 is a schematic diagram of an example of the configuration of an image forming system;

FIG. 2 is a block diagram of an example of the configuration of control systems in a digital multifunction peripheral and servers;

FIG. 4 is a diagram of an example of the structure of a document management table;

FIG. 5 is a diagram of an example of the structure of a page management table;

FIG. 6 is a diagram of an example of the structure of a print management table;

FIG. 7 is a diagram of an example of the structure of an operation log table;

FIG. 8 is a diagram of an example of the structure of an allowed amount management table;

FIG. 9 is a diagram of an example of the structure of a used amount management table;

FIG. 10 is a diagram of an example of display of an operation screen in a standby state;

FIG. 11 is a diagram of an example of display of a copy screen;

FIG. 12 is a diagram of an example of display of a confidential printing screen;

FIG. 13 is a diagram of an example of display of a discarding registration screen;

FIG. 14 is a flowchart for explaining an example of processing of copying, printing, and discarding registration in the digital multifunction peripheral;

FIG. 19 is a diagram of an example of a discarding facilitation mail;

DETAILED DESCRIPTION

Figure 3:
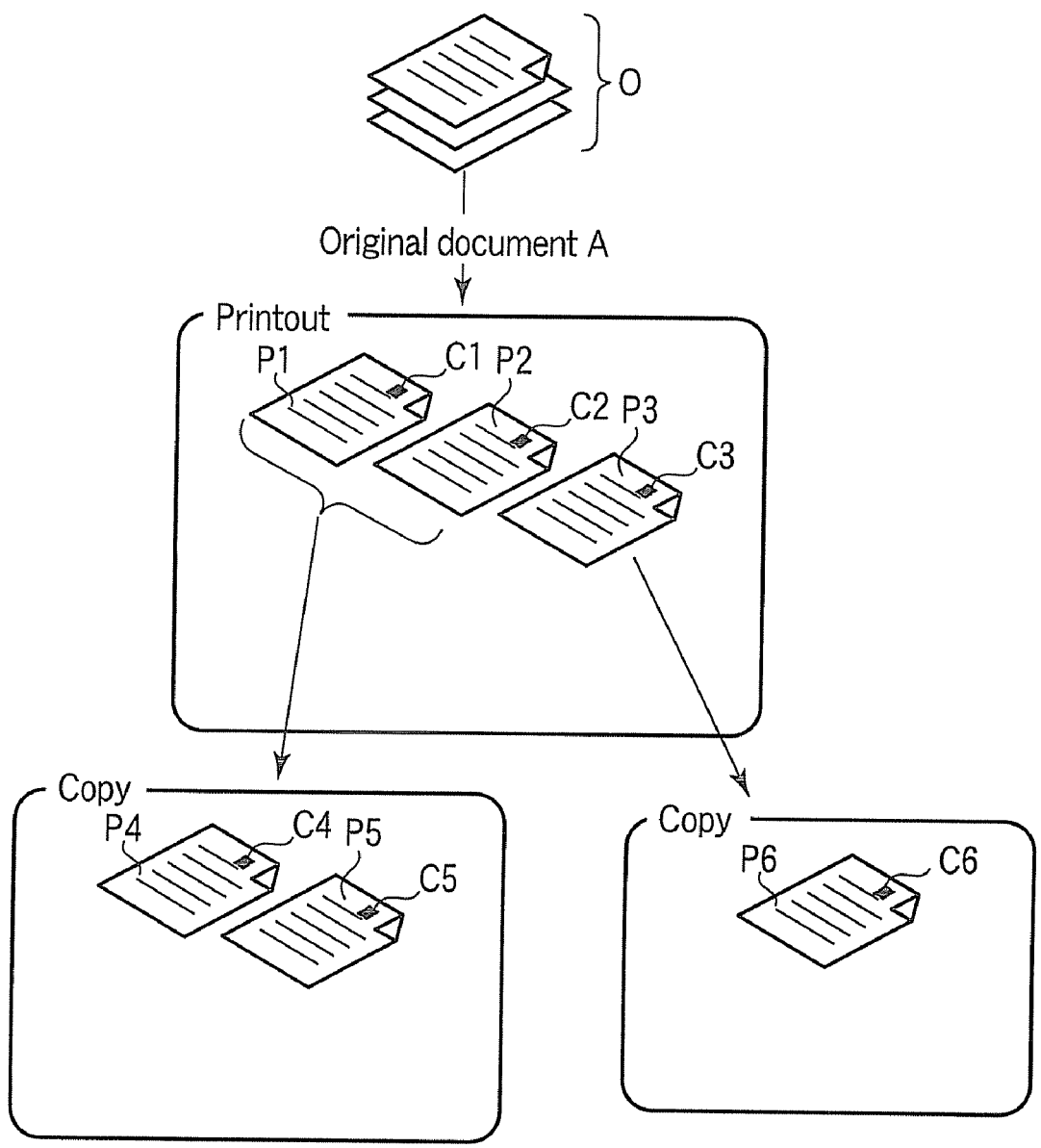
FIG. 3 is a diagram of an example in which an image and barcode information are printed or copied on a sheet.

In general, according to one embodiment, a printing managing apparatus includes a log memory, an allowed amount memory, a counting unit, a calculating unit, and an output unit. The log memory stores, in association with user identification information, information indicating a sheet printed by an image forming apparatus according to an instruction of a user or information indicating a sheet discarded by the user. The allowed amount memory stores allowed amounts of sheets usable by users. The counting unit counts the number of un-discarded sheets among sheets printed by a certain user stored by the log memory. The calculating unit calculates a usage ratio of sheets from the number of un-discarded sheets counted by the counting unit and the allowed amount of sheets for the user stored by the allowed amount memory. The output unit (ACT 403 and ACT 509) outputs information including the usage ratio of sheets calculated by the calculating unit.

It is an object of the one embodiment to provide printing managing apparatus that can effectively manage a sheet as an image formation medium.

An embodiment is explained in detail below with reference to the accompanying drawings.

FIG. 1 is a schematic diagram of an example of the configuration of an image forming system.

As shown in FIG. 1, the image forming system includes a digital multifunction peripheral 1, a print server 2, a user management server 3, and a user terminal 4. The image forming system connects the digital multifunction peripheral 1, the print server 2, the user management server 3, and the user terminal 4 via a local area network 5.

The digital multifunction peripheral (MFP) 1 functions as an image forming apparatus (a printing apparatus). The digital multifunction peripheral 1 has a scanner function, a printer function, a network communication function, and the like. The digital multifunction peripheral 1 has a communication function for performing data communication with the apparatuses (the print server 2, the user management server 3, and the user terminal 4) via the local area network 5. For example, the digital multifunction peripheral 1 as a network printer executes print processing requested by the user terminal 4.

The print server 2 is a server computer. The print server 2 has a function of performing data communication with the apparatuses via the local area network 5. The print server 2 manages print jobs requested by the apparatuses. The user management server 3 is a server computer. The user management server 3 has a function of performing data communication with the apparatuses via the local area network 5. The user management server 3 manages user information.

The user terminal 4 is a terminal apparatus used by a user. The user terminal 4 has a communication function for performing data communication with the apparatuses via the local area network 5. The user terminal 4 only has to be an apparatus that can perform data communication via the local area network 5. The user terminal 4 may be, for example, a personal computer or a portable terminal apparatus. The local area network 5 may be realized by radio communication.

The configuration of the digital multifunction peripheral 1 is schematically explained.

As shown in FIG. 1, the digital multifunction peripheral 1 includes an operation panel 7, a scanner (an image reading unit) 8, and a printer (an image forming unit) 9. The digital multifunction peripheral 1 has various external interfaces for inputting and outputting image data. The digital multifunction peripheral 1 functions as a copying machine, a scanner, a printer, or a network communication machine.

The scanner 8 reads an image on a document surface as color image data or monochrome image data. The scanner 8 optically scans a document surface to thereby read an image on the document surface. The scanner 8 includes a scanning mechanism, a photoelectric conversion unit, and a document feeder (ADF).

The printer 9 forms a color image or a monochrome image on a sheet. For example, the printer 9 is an image forming apparatus of an electrophotographic system. The printer 9 includes a sheet storing unit, a conveying mechanism, an exposing device, a photoconductive drum, a developing device, a transfer belt, a transfer device, and a fixing device. In the printer 9, the conveying mechanism conveys a sheet set in the sheet storing unit. The exposing device forms a latent image on the photoconductive drum. The developing device develops the latent image on the photoconductive drum with a toner (in the case of color printing, color toners). The transfer device transfers a toner image on the photoconductive drum developed by the developing device onto the sheet via the transfer belt. For example, the fixing device heats the sheet in a pressed state to thereby fix the toner image on the sheet. The conveying mechanism outputs, as a printing result, the sheet having the toner image fixed thereon. The printer 9 is not limited to the electrophotographic system and may perform image formation with a printing system such as an ink jet system or a thermal transfer system.

The operation panel 7 is a user interface. The operation panel 7 includes a display unit 7a incorporating various operation buttons and a touch panel. The operation panel 7 functions as an operation unit for the user to input an operation instruction and a display unit configured to display guidance and the like for the user.

The configuration of a control system in the digital multifunction peripheral 1 is explained.

FIG. 2 is a block diagram of an example of the configuration of control systems in the digital multifunction peripheral 1, the print server 2 and the user management server 3.

The digital multifunction peripheral 1 includes, as shown in FIG. 2, a system control unit 10 configured to collectively control the units of the multifunction peripheral 1. For example, the system control unit 10 controls the scanner 8 and the printer 9. The system control unit 10 acquires information input by a user or an administrator from the operation panel 7 or the user terminal 4. The system control unit 10 includes a processor (CPU) 11, a random access memory (RAM) 12, a read only memory (ROM) 13, a nonvolatile memory 14, an image processing unit 15, a network interface 16, a page memory 17, a hard disk drive (HDD) 18, and a timer 19.

The processor 11 is, for example, a CPU. The processor 11 executes control programs stored in the ROM 13, the nonvolatile memory 14 or the HDD 18 to thereby realize various processing functions. The RAM 12 is a main memory functioning as a working memory. The ROM 13 stores a control program, control data, and the like for managing the operation of the digital multifunction peripheral 1. The nonvolatile memory 14 is a rewritable nonvolatile memory. The nonvolatile memory 14 stores control programs and control data for realizing various processing functions. For example, nonvolatile memory 14 stores setting information.

The image processing unit 15 processes image data read by the scanner 8 or image data received through a network. The network interface 16 is an interface for performing communication with an external apparatus via the local area network 5. The page memory 17 is a memory having a storage area on which image data for at least one page is expanded. The HDD 18 is a large-capacity memory for data storage. The HDD 18 stores, for example, image data set as a print target.

The configuration of the print server 2 is explained below.

As shown in FIG. 2, the print server 2 includes a processor (CPU) 21, a RAM 22, a ROM 23, an HDD 24, a network interface (I/F) 25, and a timer 26.

The processor 21 is, for example, a CPU. The processor 21 manages control of the entire print server 2. The processor 21 realizes computer programs stored in the ROM 23 or the HDD 24 to thereby realize various processing functions. The processor 21 has a processing function for managing a sheet used as an image formation medium in the image forming system. The processing functions are realized by the processor 21 executing the computer programs. The RAM 22 is a working memory. The ROM 23 stores a control program, control data, and the like for managing a basic operation of the print server 2. The network interface 25 is an interface for performing data communication with the apparatuses in the local area network 5.

The HDD 24 is a storage device for data storage. The HDD 24 stores information for managing an image set as a print target in the entire system. The HDD 24 includes a document management table 24a, a page management table 24b, a print management table 24c, an operation log table 24d, an allowed amount management table 24e, and a used amount management table 24f.

The document management table 24a stores information concerning a document (an original document) set as a print target. The page management table 24b stores information concerning pages set as print targets. The print management table 24c stores information concerning a printed image. The operation log table 24d stores an operation log. The allowed amount management table 24e stores information indicating an amount of usable sheets (an allowed amount of sheets). The used amount management table 24f stores information indicating an amount of used sheets.

The digital multifunction peripheral 1 or the user management server 3 may have a part or all of the functions of the print server 2. For example, the processor 11 of the digital multifunction peripheral 1 or a processor 31 of the user management server 3 may realize the functions realized by the processor 21 executing the computer programs. The HDD 18 of the multifunction peripheral 1 or the HDD 34 of the user management server 3 may include a part or all of the document management table 24a, the page management table 24b, the print management table 24c, the operation log table 24d, the allowed amount management table 24e, and the used amount management table 24f.

The configuration of the user management server 3 is explained below.

As shown in FIG. 2, the user management server 3 includes a processor (CPU) 31, a RAM 32, a ROM 33, an HDD 34, and a network interface (I/F) 35.

The processor 31 is, for example, a CPU. The processor 31 manages control of the entire user management server 3. The processor 31 executes computer programs stored in the ROM 33 or the HDD 34 to thereby realize various processing functions. The RAM 32 is a working memory. The ROM 33 stores a control program, control data, and the like for managing a basic operation of the server 3. The HDD 34 is a storage device for data storage. The HDD 34 stores, for example, data for user authentication. The network interface 35 is an interface for performing data communication with the apparatuses in the local area network 5.

In the user management server 3, the processor 31 has a user authentication function. This function is realized by the processor 31 executing a computer program. With the user authentication function, the processor 31 authenticates a user, acquires user information such as a user ID or a password input on the operation panel 7 of the digital multifunction peripheral 1, and collates the user information acquired from the digital multifunction peripheral 1 and the data for user authentication stored in the HDD 34 to thereby determine success or failure of authentication. The digital multifunction peripheral 1 may acquire the user information used for the user authentication from an IC card carried by the user.

The digital multifunction peripheral 1 or the print server 2 may have a part or all of the functions of the user management server 3. For example, the processor 11 of the digital multifunction peripheral 1 or the processor 21 of the print server 2 may realize the user authentication function. The HDD 18 of the digital multifunction peripheral 1 or the HDD 24 of the print server 2 may store the data for user authentication.

Management of a sheet having an image printed thereon in the image forming system is explained below.

The image forming system manages a sheet having an image printed thereon. The image forming system manages generation information of an image printed on a sheet (e.g., the number of times of image formation). The image forming system can limit printing of the image according to the generation information. The image forming system issues, every time one image is copied or printed, a print ID as identification information for print processing. The print ID is, for example, information that can be converted into code information such as a two-dimensional barcode. The image forming system prints, together with the image, barcode information obtained by converting information including the print ID into a barcode on a sheet. The image forming system realizes management of the generation information for the image printed on the sheet according to the print ID obtained from the barcode information printed on the sheet. The print ID only has to be capable of being converted into information (an image) that can be printed on the sheet together with the image.

FIG. 3 is a diagram of an example in which an image and barcode information indicating a print ID are printed or copied on a sheet.

In the example shown in FIG. 3, first, the digital multifunction peripheral 1 prints an original document O including three pages. When the digital multifunction peripheral 1 prints the original document O, the print server 2 issues identification information for images of the pages of the original document O. The print server 2 converts the identification information for the images of the pages into barcodes information (barcode images) C1, C2, and C3, respectively. The print server 2 supplies the barcode information C1, C2, and C3 to the digital multifunction peripheral 1 in association with the images of the original document O that should be printed. The print server 2 stores the identification information of the images in the print management table 24c in association with generation numbers (the numbers of times of printing).

The digital multifunction peripheral 1 prints the barcode information C1, C2, and C3 issued by the print server 2 on sheets together with the images of the pages of the original document O. The digital multifunction peripheral 1 prints the barcode information C1, C2, and C3 in, for example, reference positions in the sheets. In the example shown in FIG. 3, the digital multifunction peripheral 1 generates a sheet 21 having the barcode information C1 printed at the upper right in the image of the first page of the original document O, a sheet P2 having the barcode information C2 printed at the upper right in the image of the second page of the original document O, and a sheet 23 having the barcode information C3 printed at the upper right in the image of the third page of the original document O.

In copying the sheets 21 and P2, the digital multifunction peripheral 1 scans the sheets 21 and P2 and converts images on the sheets P1 and P2 into data of scanned images. The digital multifunction peripheral 1 transfers the scanned images (the image of the sheet P1 and the image of the sheet P2) to the print server 2. The print server 2 extracts the barcode information from the scanned images of the sheets P1 and P2, respectively. The print server 2 determines print IDs of the images from the extracted barcode information. The print server 2 checks the numbers of times of printing of the images according to the determined print IDs and determines whether copying of the sheets P1 and P2 is possible. If the print server 2 determines that the copying of the sheets P1 and P2 is possible, the print server 2 issues two pieces of new identification information.

The print server 2 converts the issued identification information into barcode information (e.g., two-dimensional barcodes) C4 and C5, respectively. The print server 2 supplies print data obtained by adding the barcode information C4 to the image of the sheet P1 and print data obtained by adding the barcode information C5 to the image of the sheet P2 to the digital multifunction peripheral 1. The print server 2 may supply the image data of the originals of the images to the digital multifunction peripheral 1 as images for printing according to the print IDs. The print server 2 stores the identification information of the images issued anew in the print management table 24c in association with generation numbers (the numbers of times of printing).

The digital multifunction peripheral 1 prints (copies) the image of the sheet 21 (or the image data of the original) and the barcode information C4 issued by the print server 2 on a sheet 24. However, the digital multifunction peripheral 1 prints print data obtained by replacing the barcode information C1 in the image of the sheet P1 with the barcode information C4. The digital multifunction peripheral 1 prints (copies) the image of the sheet P2 (or the image data of the original) and the barcode information C5 issued by the print server 2 on a sheet P5. However, the digital multifunction peripheral 1 prints print data obtained by replacing the barcode information C2 in the image of the sheet P2 with the barcode information C5.

In copying the sheet 23, the digital multifunction peripheral 1 scans the sheet P3 and transfers a scanned image to the print server 2. The print server 2 extracts the barcode information from the scanned image of the sheet P3 and determines the identification information from the extracted barcode information. The print server 2 determines, according to the determined identification information and management information explained later, whether copying of the sheet 23 is possible. If the print server 2 determines that the copying of the sheet 23 is possible, the print server 2 issues one piece of new identification information and converts the issued identification information into barcode information (e.g., two-dimensional barcode) C6.

The print server 2 supplies print data obtained by adding the barcode information C6 to the image of the sheet P3 to the digital multifunction peripheral 1. In the print data, the digital multifunction peripheral 1 replaces the barcode information C3 in the image of the sheet P3 with the barcode information C6. Therefore, the digital multifunction peripheral 1 prints an image obtained by replacing the barcode information C3 in the image of the sheet P3 with the barcode information C6. The print server 2 stores the identification information of the images issued anew in the print management table 24c in association with generation numbers (the numbers of times of printing).

Information managed by the print server 2 is explained below.

FIG. 4 is a diagram of an example of the structure of the document management table 24a.

The document management table 24a stores information concerning a document set as a management target to be printed or copied. The document includes an image(s) of one or plural pages. For example, the document management table 24a stores information for identifying the document and security setting information such as copy limitation on the entire document.

In the example shown in FIG. 4, the document management table 24a stores a document ID, a file name, the number of pages, and original data in association with each other. The document ID is document identification information for identifying a document. In printing a new document, the print server 2 issues a document ID for the entire document. In copying an original document(s) (one or plural original documents) not attached with barcode information, the print server 2 (or the digital multi function peripheral 1) issues a document ID to an entire document including an image(s) of the original(s). The file name is a name of electronic data of the document. The number of pages is a total number of pages of images included in the document. The original data is image data as the original of the page images included in the document data.

FIG. 5 is a diagram of an example of the structure of the page management table 24b.

The page management table 24b stores information concerning images (respective images) of pages to be printed or copied. For example, the page management table 24b stores information for identifying a confidentiality level, an expiration date, and an output flag for the images of the pages and information concerning security setting for the images of the pages.

In the example shown in FIG. 5, the page management table 24b stores a page ID, a document ID, a page number, a confidentiality level, an expiration date, and an output flag in association with each other. The page ID is page identification information for identifying an image of each page. The document ID is document identification information for identifying a document to which the image of the page belongs. The page ID may be information to be completely unique or may be information to be unique when combined with the document ID in the system. In registering a new document in the document management table 24a, the print server 2 also registers information concerning the page of the document in the page management table 24b. In registering the information concerning the page of the document in the page management table 24b, the print server 2 issues a page ID for the page.

The confidentiality level indicates security setting for the image of the page. For example, as the confidentiality level, any one of a level 1 (lowest) to a level 5 (highest) is set in order from a level with a lowest confidentiality degree. The user may set the confidentiality level at the time of creating a document or the administrator may set the confidentiality level later. The confidentiality level is information indicating printing (copying) authority for the image of the page. The expiration date is information indicating an expiration date of printing (copying) for the image of the page. For example, the user may register the expiration date or the administrator may set the expiration date. The output flag is a flag indicating whether printing and copying for the image of the page is permitted.

FIG. 6 is a diagram of an example of the structure of the print management table 24c.

The print management table 24c stores information concerning print processing. For example, the print management table 24c stores information for identifying print processing for an image of each page, the number of times of printing (a generation number) for the image of the page, and information indicating, for example, a discarding state of a print result.

In the example shown in FIG. 6, the print management table 24c stores a print ID, a print ID of immediately preceding generation, a generation number, a page ID, a user ID, a discarding flag, and the like. The print ID is identification information for identifying one print processing for an image for one page. The print ID of immediately preceding generation is a print ID of the last print processing for the image subjected to the print processing. The generation number is a cumulative number of times of printing for the image of the page printed by the print processing. The page ID is identification information indicating the page of the printed image. The user ID is identification information indicating a user who executed the print processing. The discarding flag is a flag indicating whether a print result (a sheet) is discarded. The discarding flag is updated by discarding registration processing for registering discarding of the sheet.

FIG. 7 is a diagram of an example of the structure of the operation log table 24d.

The operation log table 24d stores information indicating an operation history (an operation log) by the user. The operation log table 24d stores information indicating a history of processing such as copying, printing, and discarding executed according to the operation by the user.

In the example shown in FIG. 7, the operation log table 24d stores date and time, a user ID, operation content (processing content), a size, and a print ID in association with each other. The date and time is information indicating date and time when operation (processing) is executed. The user ID is identification information indicating a user who executed the operation (the processing). The operation content (the processing content) is information indicating content of the executed operation (processing). In the example shown in FIG. 7, copying, printing, discarding, and the like are registered as the operation content (the processing content). The size is information indicating a size of a sheet subjected to the operation (the processing). The print ID is information for identifying the sheet subjected to the operation (the processing).

FIG. 8 is a diagram of an example of the structure of the allowed amount management table 24e.

The allowed amount management table 24e stores information concerning an allowed amount of sheets that can be used for printing or copying. The allowed amount management table 24e can store an allowed amount of sheets of each office, an allowed amount of sheets of each floor, an allowed amount of sheets of each area (department), and an allowed amount of sheets of each user.

In the example shown in FIG. 8, the allowed amount management table 24e stores an office allowed amount of sheets, a floor, an allowed amount of sheets by floor, a department, an allowed amount of sheets by department, a user ID, and an allowed amount of sheets by user in association with each other. The office allowed amount of sheets is information indicating an allowed amount of sheets that can be printed or copied in an entire office. The floor and the allowed amount of sheets by floor indicate an allowed amount of sheets that can be printed or copied in each floor. The department and the allowed amount of sheets by department indicate an allowed amount of sheets that can be printed or copied in each department. The user ID and the allowed amount of sheets by user indicate an allowed amount of sheets that can be printed or copied by each user. For example, the administrator sets the information such as the allowed amounts of sheets stored in the allowed amount management table 24e.

FIG. 9 is a diagram of an example of the structure of the used amount management table 24f.

The used amount management table 24f stores information concerning a used amount of sheets used for printing or copying. The used amount management table 24f stores a used amount, an allowed amount of sheets, a usage ratio, and the like in association with each other. The used amount management table 24f can be used for each individual or group for which an allowed amount of sheets is set.

In the example shown in FIG. 9, the used amount management table 24f stores a user ID, a used amount, an allowed amount of sheets, and a usage ratio in association with each other. The used amount management table 24f shown in FIG. 9 is a diagram of an example of a table that stores information concerning a used amount for each user. The user ID is identification information for identifying a user. The used amount is information indicating an amount of sheets being used by the user corresponding to the user ID. The allowed amount of sheets is information indicating an allowed amount of sheets that can be printed or copied by the user. The usage ratio is information indicating a ratio of the used amount of sheets with respect to the allowed amount of sheets.

Copying or printing in the image forming system is explained below.

In the image forming system, since a user who executed copying or printing is identified, copying, printing, or discarding of a sheet is performed according to an instruction of a user who succeeded in authentication. The digital multifunction peripheral 1 executes user authentication by the user management server 3 using user information (a user ID and a password, etc.) input to the operation panel 7 by a user or user information acquired from an ID card such as an IC card presented by the user.

An example of processing of copying, printing, and discarding registration in the digital multifunction peripheral 1 is explained below.

Figures 10, 11, 12, 13:
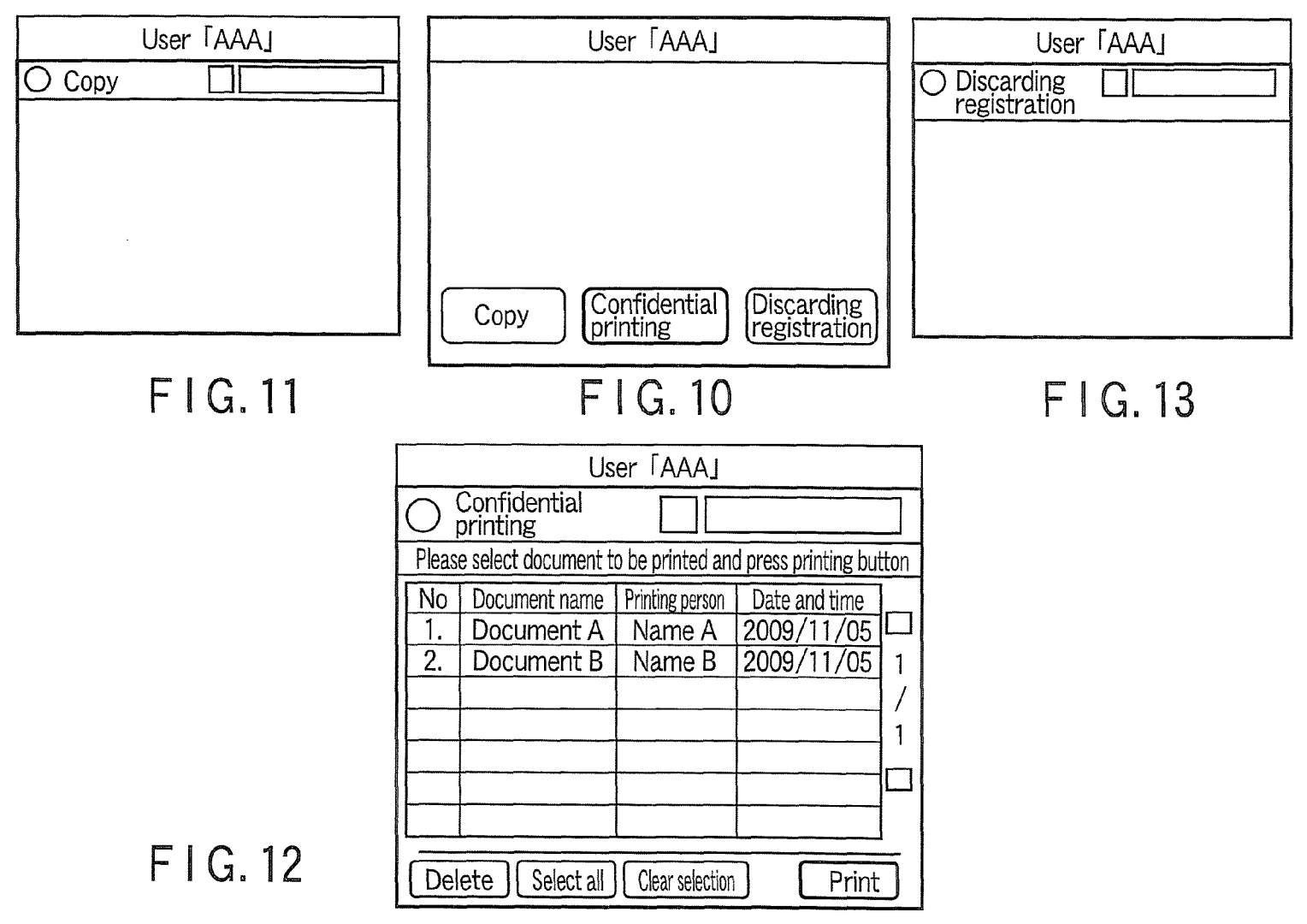

FIG. 10 is a diagram of an example of display of an operation screen in a standby state displayed on the display unit 7a of the operation panel 7 when the authentication of the user is successful. The operation panel 7 displays a copy button, a confidential printing button, and a discarding registration button on the operation screen shown in FIG. 10. In executing copying, the user presses the copy button. In executing confidential printing (private printing), the user presses the confidential printing button. In executing discarding of a sheet, the user presses the discarding registration button.

When the user depresses the copy button, the operation panel 7 displays a copy screen on the display unit 7a. FIG. 11 is a diagram of an example of display of the copy screen. On the copy screen shown in FIG. 11, various kinds of copy setting can be input. On the copy screen, the user inputs copy setting and instructs the start of copying. When the user instructs the start of copying, the digital multifunction peripheral 1 starts copy processing for an original document set by the user.

When the user presses the confidential printing button, the operation panel 7 displays a confidential printing screen on the display unit 7a. FIG. 12 is a diagram of an example of display of the confidential printing screen. On the confidential printing screen shown in FIG. 12, print data that the user can print are displayed as a list. On the confidential printing screen, the user designates print data to be printed and instructs the start of printing. When the user instructs the start of printing, the digital multifunction peripheral 1 starts print processing for the print data designated by the user.

When the user presses the discarding registration button, the operation panel 7 displays a discarding registration screen on the display unit 7a. FIG. 13 is a diagram of an example of display of the discarding registration screen. On the discarding registration screen shown in FIG. 13, setting concerning discarding processing for a sheet can be input. On the discarding registration screen, the user sets a sheet to be discarded on the scanner 8 and instructs the start of discarding registration. When the user instructs the start of the discarding registration, the digital multifunction peripheral 1 starts discarding registration processing for the sheet set by the user.

FIG. 14 is a flowchart for explaining an example of processing of copying, printing, and discarding registration in the digital multifunction peripheral 1.

Copying processing in the digital multifunction peripheral 1 is explained with reference to FIG. 14.

A user who requests copying sets an original document on the scanner 8 of the digital multifunction peripheral 1, inputs copy setting with the operation panel 7, and instructs the start of copying. It is assumed that, in a state in which the copy screen shown in FIG. 11 is displayed, the user sets, on the scanner 8, an original document having barcode information printed thereon and inputs an instruction for copy execution on the operation panel 7.

The system control unit 10 receives the instruction for copy execution from the operation panel 7. If the system control unit 10 receives the instruction for copy execution (YES in ACT 101), the processor 11 reads, with the scanner 8, the original document set by the user (ACT 102). The processor 11 of the system control unit 10 transmits a scanned image of the original document read by the scanner 8 and information indicating the copy setting (copy setting information) to the print server 2 (ACT 103). After transmitting the scanned image of the original document to be copied, the processor 11 of the system control unit 10 waits for reception of print data (PJL) from the print server 2 (ACT 104).

If the print data is received from the print server 2 (YES in ACT 104), the processor 11 of the system control unit 10 prints the received print data on a sheet with the printer 9 (ACT 105). When the printing of the print data on the sheet by the printer 9 is completed, the processor 21 transmits notification indicating the completion of the printing to the print server 2, which is a transmission source of the print data, via the network interface 16 (ACT 106).

Print processing in the digital multifunction peripheral 1 is explained with reference to FIG. 14.

A user who requests printing in the digital multifunction peripheral 1 designates, with the operation panel 7, image data set as a print target, inputs print setting, and inputs designation of the start of printing. It is assumed that, on the confidential printing screen shown in FIG. 12, the user designates, with the operation panel 7, a document (image data) to be printed and inputs an instruction for print execution.

The system control unit 10 receives the instruction for print execution from the operation panel 7. If the processor 11 of the system control unit 10 receives the instruction for print execution (YES in ACT 111), the processor 11 acquires information (e.g., a document ID and a page ID of an image) indicating the image data set as the print target designated by the user (ACT 112).

After transmitting the information indicating the image data set as the print target, the processor 11 of the system control unit 10 waits for reception of print data (PJL) from the print server 2 (ACT 104). If the processor 11 of the system control unit 10 receives the print data from the print server 2 (YES in ACT 104), the processor 11 prints the received print data on a sheet with the printer 9 (ACT 105). When the printing of the print data on the sheet by the printer 9 is completed, the processor 11 transmits notification indicating the completion of the printing to the print server 2, which is a transmission source of the print data, via the network interface 16 (ACT 106).

The print processing by the digital multifunction peripheral 1 may be started according to a print request from the user terminal 4. When the print processing is executed according to a print request from the user terminal 4, the user terminal 4 executes the processing in ACTS 111 to 112 and the digital multifunction peripheral 1 executes the processing in ACTS 104 to 106.

Copy processing and print processing in the print server 2 is explained below.

Figure 15:
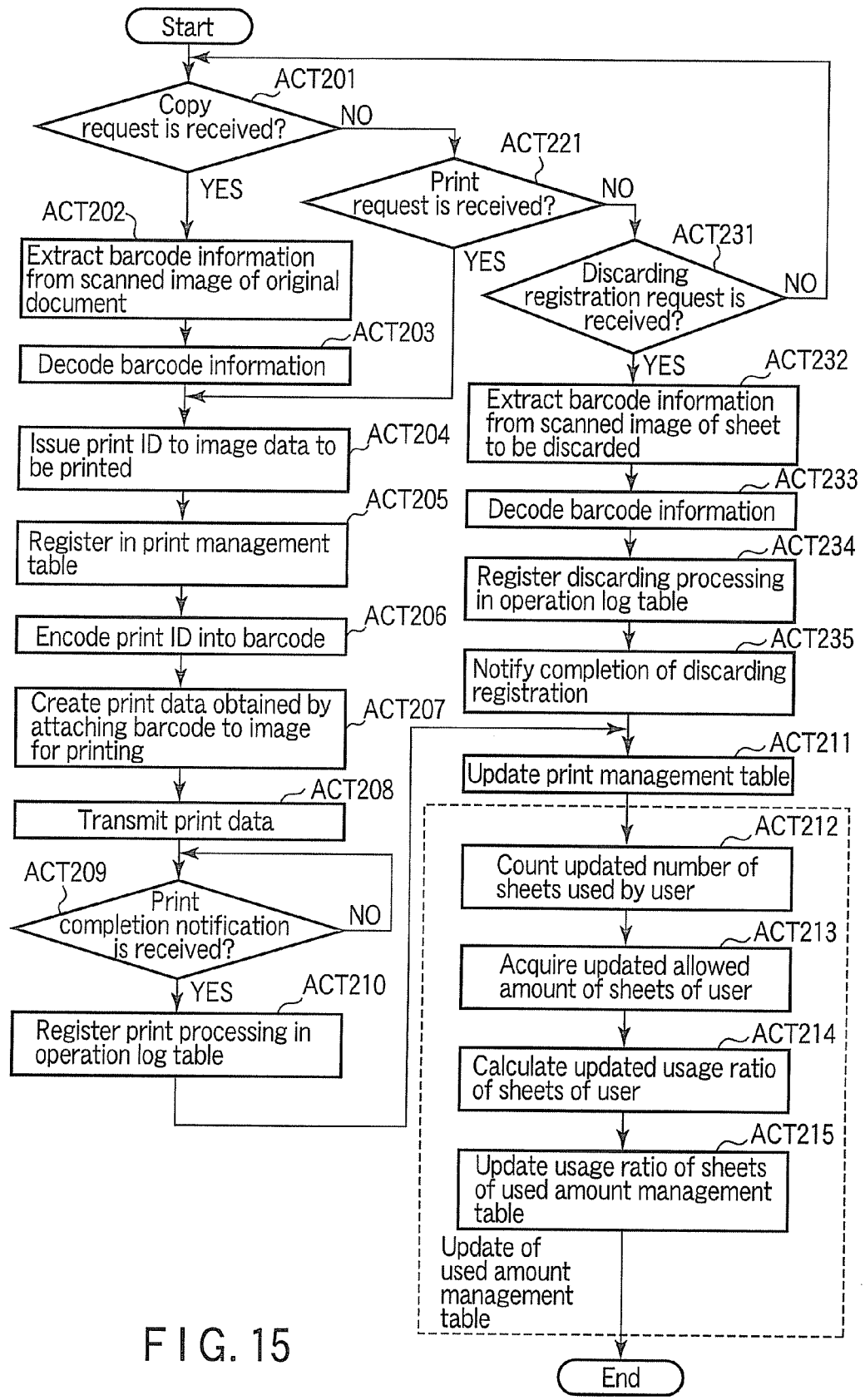
FIG. 15 is a flowchart for explaining an example of processing of copying, printing, and discarding registration in a print server.

FIG. 15 is a flowchart for explaining an example of processing of copying, printing and discarding registration.

The copy processing and the print processing in the print server 2 are explained with reference to FIG. 15.

If a copy request is received from the digital multifunction peripheral 1 (YES in ACT 201), the print server 2 acquires a scanned image of an original document including barcode information and copy setting information from the digital multifunction peripheral 1.

After acquiring the scanned image of the original document including the barcode information, the processor 21 of the print server 2 extracts the barcode information (a barcode image) from the scanned image (ACT 202). After extracting the barcode information from the scanned image, the processor 21 recognizes (decodes) the extracted barcode information (ACT 203). The barcode information includes a print ID. The print ID is identification information issued every time an image is printed on one sheet.

After decoding the barcode information extracted from the scanned image, the processor 21 of the print server 2 issues a new print ID given to a sheet having the image of the original document copied thereon (ACT 204). The processor 21 registers information such as a page ID of the image of the original document, a print ID of immediately preceding generation, and a generation number in the print management table 24c in association with the print ID issued anew (ACT 205). For example, the processor 21 searches through the print management table 24c to thereby determine the page ID, the print ID of immediately preceding generation, the generation number, and the like corresponding to the print ID of the original document.

After issuing the print ID, the processor 21 converts (encodes) information including the issued print ID into one piece of barcode information (ACT 206). After converting the information including the issued print ID into the barcode information, the processor 21 forms print data (PJL) in which the barcode information is arranged in an image for printing (combines the image for printing and the barcode image) (ACT 207). In the case of the copy processing, the processor 21 may use image data of the original of the original document, which can be specified by the print management table 24c and the page management table 24b, as the image for printing.

After creating the print data, the processor 21 transmits the created print data to the digital multifunction peripheral 1 (ACT 208). After transmitting the print data, the print server 2 waits for notification of completion of printing from the digital multifunction peripheral 1 (ACT 209). If the processor 21 of the print server 2 receives the notification of completion of the printing from the digital multifunction peripheral 1 (YES in ACT 209), the processor 21 registers the print processing in the operation log table 24d (ACT 210). For example, the processor 21 registers, as history information of print processing (or copy processing) for one job, date and time when printing (or copying) is executed, a user ID of a user who instructed the printing, information indicating that processing content is the copying or the printing, a size of a printed sheet, and a print ID in the operation log table 24d.

Further, the processor 21 updates the print management table 24c and the used amount management table 24f (ACT 211 and ACTS 212 to 215). For example, after receiving the notification of completion of the printing, the processor 21 updates, in the print management table 24c, a discarding flag corresponding to the print ID of the completed printing to information "false" indicating that a sheet is not discarded or is in use (ACT 211).

After receiving the notification of completion of the printing, the processor 21 determines a user ID corresponding to the print ID of the completed printing (a user ID of a user for whom the used amount management table 24f should be updated). After determining the user ID of the completed printing, the processor 21 counts, from the information registered in the operation log table 24d, the number of sheets that are not discarded (is being used) by the user having the user ID (ACT 212). The number of sheets being used by the user may be counted by adding the number of sheets printed anew to the number of used sheets registered in the used amount management table 24f.

After counting the number of used sheets of the user to be updated, the processor 21 acquires an allowed amount of sheets for the user from the allowed amount management table 24e. The processor 21 calculates a usage ratio of sheets for the user according to the acquired number of used sheets and the acquired allowed amount of sheets (ACT 214). For example, the processor 21 calculates a usage ratio of sheets according to (the number of used sheets)/(allowed amount of sheets)×100[%]. After calculating the usage ratio of sheets, the processor 21 updates the number of used sheets and the usage ratio of sheets corresponding to the user ID (ACT 215).

If the processor 21 of the print server 2 receives a print request from the digital multifunction peripheral 1 or the user terminal 4 (YES in ACT 221), the processor 21 proceeds to ACT 204 and issues a new print ID given to a sheet having received image data for printing printed thereon (ACT 204). After issuing the print ID for the image data for printing, the processor 21 executes the processing in ACTS 205 to 215.

The image forming system stores information indicating a state of the sheet having the original document copied thereon by the copy processing or the sheet having the image printed thereon by the print processing in the print management table 24c. The image forming system stores information concerning a used amount of sheets for each user in the used amount management table 24f. With the image forming system, it is possible to manage the state of the copied or printed sheet and also easily manage the used amount of sheets for each user.

The digital multifunction peripheral 1 may execute a part or all of the pieces of processing (ACTS 201 to 215) executed by the print server 2. The processing in ACTS 201 to 215 is a function that can be realized by a processor executing a computer program. Therefore, the processor 11 of the digital multifunction peripheral 1 can execute the processing in ACTS 201 to 215. According to a form in which the processor 11 of the digital multifunction peripheral 1 executes the processing in ACTS 201 to 215, the digital multifunction peripheral 1 alone can realize the copy processing and the print processing explained above.

Discarding registration processing in the image forming system is explained below.

The discarding registration processing is processing for registering discarding a sheet obtained as a print result. In the discarding registration processing, the digital multifunction peripheral 1 scans a sheet to be discarded with the scanner 8. The digital multifunction peripheral 1 transmits an image obtained by scanning the sheet to be discarded to the print server 2. The print server 2 specifies the sheet to be discarded (e.g., a print ID) according to barcode information included in the scanned image. After specifying the print ID of the sheet to be discarded, the print server 2 updates a discarding flag indicating a state of the sheet corresponding to the print ID to "True" (information indicating that the sheet is discarded).

However, processing for scanning the sheet to be discarded may be executed by an apparatus different from the digital multifunction peripheral 1 such as a scanner that can perform data communication with the print server 2 via the network 5. For example, processing for scanning the sheet to be discarded may be executed by a shredder including a mechanism for scanning the sheet before the sheet is cut. The shredder has a function of transmitting the scanned image of the sheet to be discarded to the print server 2.

In the following explanation, it is assumed that, in the discarding registration processing, the scanner 8 of the digital multifunction peripheral 1 scans the sheet to be discarded.

The discarding registration processing in the digital multifunction peripheral 1 is explained with reference to FIG. 14.

A user who requests discarding registration sets a sheet to be discarded on the scanner 8 of the digital multifunction peripheral 1 and instructs the start of discarding registration with the operation panel 7. For example, when the user presses the discarding registration button on the standby screen shown in FIG. 10, the display unit 7a of the operation panel 7 displays the discarding registration screen shown in FIG. 13. In a state in which the discarding registration screen is displayed, the user sets the sheet to be discarded on the scanner 8 and inputs an instruction for the start of the discarding registration on the operation panel 7.

If the processor 11 of the system control unit 10 receives the instruction for the start of the discarding registration from the operation panel 7 (YES in ACT 121), the processor 11 reads, with the scanner 8, an image of the sheet to be discarded set by the user (an image including information indicating the sheet to be discarded) (ACT 122). The processor 11 of the system control unit 10 transmits a scanned image of the sheet to be discarded read by the scanner 8 and a discarding registration request to the print server 2 (ACT 123).

The digital multifunction peripheral 1 may transmit information (a print ID) itself indicating the sheet to be discarded to the print server 2 instead of the scanned image of the sheet to be discarded. For example, the digital multifunction peripheral 1 may decode barcode information included in an image obtained by scanning the sheet to be discarded and transmits a print ID included in the decoded information to the print server 2 together with the discarding registration request.

The information indicating the sheet to be discarded such as the print ID may be input on the operation panel 7. In this case, the digital multifunction peripheral 1 only has to transmit the information indicating the sheet to be discarded such as the print ID input on the operation panel 7 to the print server 2 together with the discarding registration request.

After transmitting the discarding registration request, the processor 11 of the system control unit 10 waits for notification of completion of the discarding registration from the print server 2 (ACT 124). If the processor 11 receives the notification of completion of the discarding registration from the print server 2 (YES in ACT 124), the processor 11 displays guidance indicating that discarding is completed on the display unit 7a (ACT 125).

Discarding registration processing in the print server 2 is explained below.

The discarding registration processing in the print server 2 is explained with reference to FIG. 15.

If the print server 2 receives a discarding registration request (YES in ACT 231), the print server 2 acquires a scanned image of a sheet to be discarded including barcode information together with the discarding registration request. After acquiring the scanned image of the sheet to be discarded including the barcode information, the processor 21 of the print server 2 extracts the barcode information (a barcode image) from the scanned image (ACT 232). After extracting the barcode information from the scanned image, the processor 21 recognizes (decodes) the extracted barcode information (ACT 233). Information obtained by decoding the barcode information includes a print ID for uniquely specifying the sheet.

After decoding the barcode information extracted from the scanned image, the processor 21 of the print server 2 registers, in the operation log table 24d, information indicating that the sheet having the print ID included in the decoded information is discarded (ACT 234). For example, the processor 21 registers, as history information of the discarding registration processing for one job, date and time when the sheet is discarded, a user ID of a user who instructed discarding registration, information indicating that processing content is discarding, a size of a discarded sheet, and a print ID of a discarded sheet in the operation log table 24d. After registering the history information indicating the discarding registration processing in the operation log table 24d, the processor 21 notifies the digital multifunction peripheral 1 that the discarding registration is completed (ACT 235).

After acquiring the print ID of the sheet to be discarded, the processor 21 updates the print management table 24c and the used amount management table 24f (ACT 211 and ACTS 212 to 215). As update processing for the print management table 24c, for example, the processor 21 updates, in the print management table 24c, a discarding flag corresponding to the print ID of the sheet to be discarded to "True" (information indicating that the sheet is discarded) (ACT 211).

As the update processing for the used amount management table 24f, the processor 21 determines a user ID corresponding to the print ID of the discarded sheet (a user ID of a user for whom the used amount management table 24f should be updated). After determining the user ID of the discarded sheet, the processor 21 counts the number of sheets not discarded (being used) by the user of the user ID from the information registered in the operation log table 24d (ACT 212). The processor 21 may subtract the number of discarded sheets from the number of used sheets registered in the used amount management table 24f to thereby count the number of sheets being used by the user.

After counting the number of used sheets of the user to be update, the processor 21 acquires an allowed amount of sheets for the user from the allowed amount management table 24e. The Processor 21 calculates a usage ratio of sheets for the user according to the acquired number of used sheets and the acquired allowed amount of sheets (ACT 214). For example, the processor 21 calculates a usage ratio of sheets according to (the number of used sheets)/(allowed amount of sheets)×100[%]. After calculating the usage ratio of sheets, the processor 21 updates the number of used sheets and the usage ratio of sheets corresponding to the user ID in the used amount management table 24f (ACT 215).

After updating the print management table 24c and the used amount management table 24f, the processor 21 may notify the digital multifunction peripheral 1 of completion of the discarding registration.

In the discarding registration processing, the image forming system scans an image to be discarded with the scanner 8 and discriminates identification information of the sheet from barcode information included in the scanned image. The image forming system registers information concerning the discarded sheet in the operation log table 24d, updates a state of the sheets specified by the identification information to a discarded state in print management table 24c, and also updates information indicating a used amount in the used amount management table 24f. With the discarding registration processing, it is possible to manage discarding of a copied or printed sheet and also easily manage, for example, a used amount of sheets for each user.

The digital multifunction peripheral 1 may execute a part or all of the pieces of processing (ACTS 231 to 235 and 211 to 215) executed by the print server 2. The processing in ACTS 231 to 235 and 211 to 215 is a function that can be realized by a processor executing a computer program. Therefore, the processor 11 of the digital multifunction peripheral 1 can executes the processing in ACTS 231 to 235 and 211 to 215. If the processor 11 of the digital multifunction peripheral 1 executes the processing in ACTS 231 to 235 and 211 to 215, the digital multifunction peripheral 1 alone can realize the discarding registration processing.

Processing for notifying a user of a usage ratio of sheets is explained below.

The image forming system has a function of notifying a logged-in user of a usage ratio of sheets. For example, the digital multifunction peripheral 1 has a function of displaying a usage ratio of sheets of the logged-in user on the display unit 7a of the operation panel 7.

Figure 16:
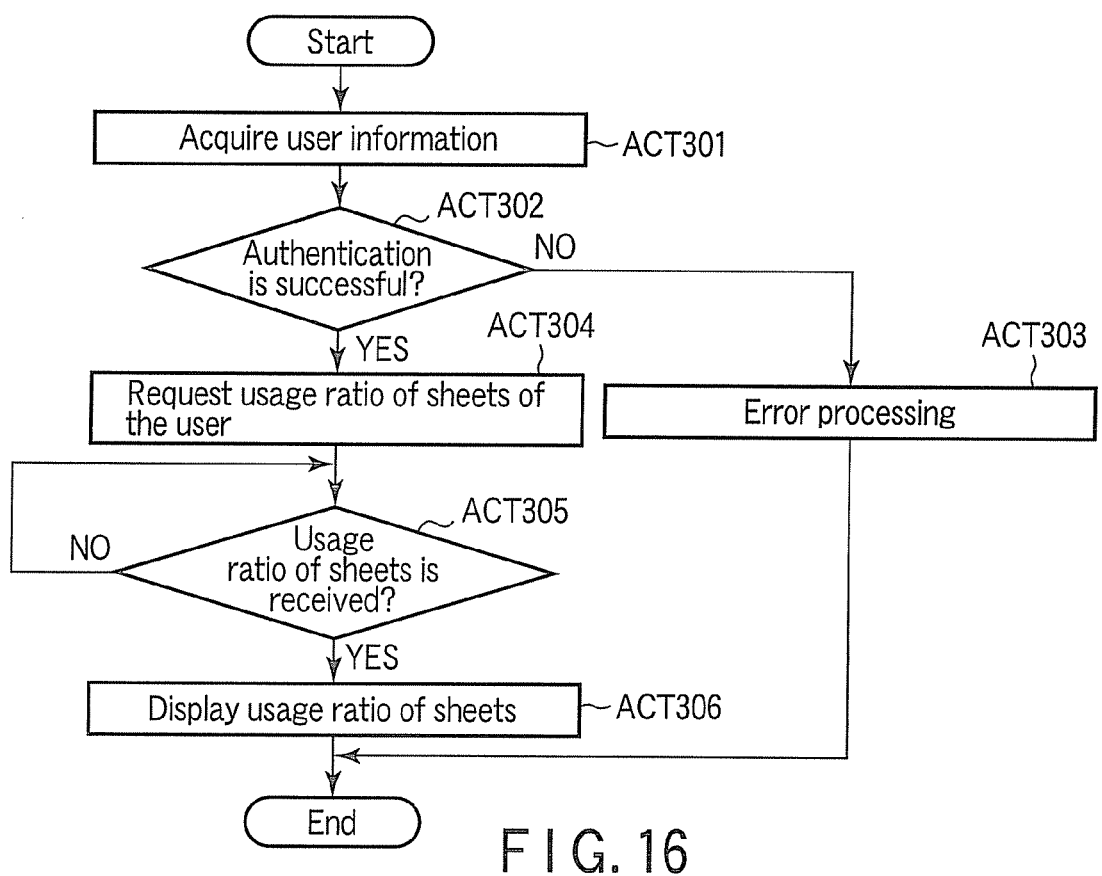
FIG. 16 is a flowchart for explaining the operation of the digital multifunction peripheral in processing for notifying a usage ratio of sheets.

FIG. 16 is a flowchart for explaining the operation of the digital multifunction peripheral 1 in processing for notifying a usage ratio of sheets.

The digital multifunction peripheral 1 acquires user information from a user who desires to log in (ACT 301). For example, a logging-in user inputs user information such as a user ID and a password on the operation panel 7 of the digital multifunction peripheral 1. The digital multifunction peripheral 1 may acquire user information from an IC card carried by the logging-in user. After acquiring the user information, the processor 11 of the system control unit 10 transmits a user authentication request to the user management server 3 together with the acquired user information. The user management server 3 performs user authentication according to the user information acquired from the digital multifunction peripheral 1 and transmits a user authentication result to the digital multifunction peripheral 1.

If the processor 11 of the digital multifunction peripheral 1 receives notification indicating that the authentication of the user is unsuccessful from the user management server 3 (NO in ACT 302), the processor 11 executes error processing such as retry (ACT 303). If the processor 11 of the digital multifunction peripheral 1 receives notification indicating that the authentication of the user is successful from the user management server 3 (YES in ACT 302), the processor 11 request the print server 2 to transmit information indicating a usage ratio of sheets of the user (the user indicated by the user ID) (ACT 304). When the authentication is successful, the digital multifunction peripheral 1 acquires at least the user ID for identifying the user from the user management server 3. In other words, the processor 11 requests the print server 2 to transmit a usage ratio of sheets corresponding to the user ID of the user whose authentication is successful.

After requesting information indicating a usage ratio of sheets of the user, the processor 11 waits for reception of the information indicating a usage ratio of sheets from the print server 2. If the processor 11 receives the information indicating a usage ratio of sheets of the user from the print server 2 (YES in ACT 305), the processor 11 displays a present usage ratio of sheets by the user on the display unit 7a of the operation panel 7 (ACT 306). For example, the processor 11 may display a used amount of sheets of the user together with the usage ratio of sheets by the user or display a usage ratio of sheets of a department, a floor, or an entire office. The processor 11 may display a usage ratio of sheets on the standby screen shown in FIG. 10.

Figure 17:
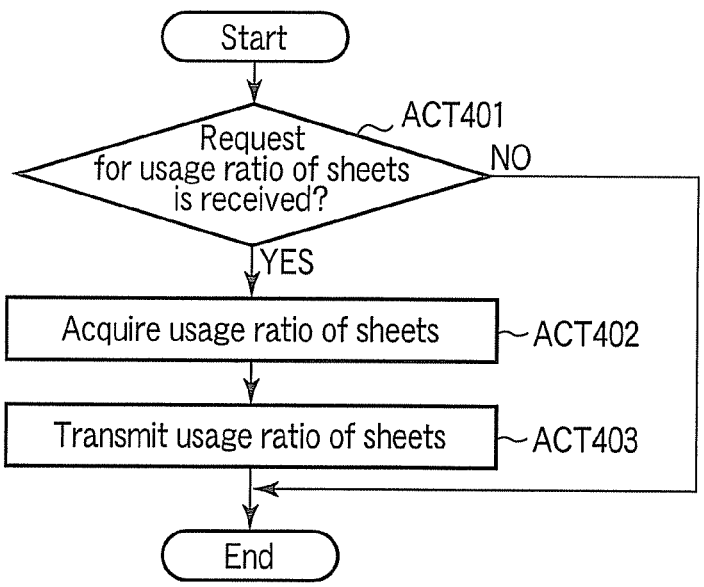
FIG. 17 is a flowchart for explaining the operation of the print server in processing for notifying a usage ratio of sheets.

FIG. 17 is a flowchart for explaining the operation of the print server 2 in the processing for notifying a usage ratio of sheets.

It is assumed that the print server 2 receives a request for notification of a usage ratio of sheets corresponding to a designated user ID from the digital multifunction peripheral 1. If the processor 21 of the print server 2 receives the request for notification of a usage ratio of sheets (YES in ACT 401), the processor 21 searches through the usage amount management table 24f with the designated user ID to thereby acquire a usage ratio of sheets corresponding to the user ID from the used amount management table 24f (ACT 402). After acquiring the usage ratio of sheets corresponding to the user ID, the processor 21 transmits information indicating the acquired usage ratio of sheets to the digital multifunction peripheral 1 (ACT 403).

The processor 21 may executes the processing in ACTS 212 to 215 shown in FIG. 15 as processing in ACT 402. Specifically, when a usage ratio of sheets is requested, the processor 21 may calculate a usage ratio from the number of used sheets of the user and an allowed amount of sheets and notify the usage ratio to the digital multifunction peripheral 1. When the processing in ACTS 212 to 215 shown in FIG. 15 is executed as the processing in ACT 402, in the print processing and the discarding registration processing shown in FIG. 15, the processing in ACTS 212 to 215 shown in FIG. 15 can be omitted.

The print server 2 may also acquire information other than the usage ratio of sheets corresponding to the user ID (e.g., a used amount (the number of used sheets) and an allowed amount of sheets) from the tables 24a to 24f and notify the digital multifunction peripheral 1 of the information. In this case, the digital multifunction peripheral 1 can also display the information other than the usage ratio of sheets on the display unit 7a of the operation panel 7.

In the processing for notifying a usage ratio, when a user logs in, the digital multifunction peripheral 1 acquires a usage ratio of sheets of the logged-in user from the print server 2.

The digital multifunction peripheral 1 displays a present usage ratio of sheets by the user acquired from the print server 2 on the display unit 7a of the operation panel 7. Since a usage ratio of sheets of each user is displayed on the display unit 7a, the user can recognize a present state of use of sheets every time the user logs in.

The digital multifunction peripheral 1 may execute a part or all of the pieces of processing (ACTS 401 to 403) executed by the print server 2. The processing in ACTS 401 to 403 is a function that can be realized by a processor executing a computer program. Therefore, the processor 11 of the digital multifunction peripheral 1 can execute the processing in ACTS 401 to 403. If the processor 11 of the digital multifunction peripheral 1 executes the processing in ACTS 401 to 403, the digital multifunction peripheral 1 alone can realize the processing for notifying the user of a usage ratio of sheets.

Processing for urging a user having a high usage ratio of sheets to discard a sheet (discarding urging processing) is explained below.

The print server 2 has a function of transmitting a mail for urging a user having a high usage ratio of sheets to discard a sheet. The print server 2 determines whether a usage ratio of sheets of each user exceeds a certain threshold (e.g., 80%). The print server 2 transmits a mail for urging discarding of a sheet having a close expiration date to a user having a usage ratio of sheets exceeding the threshold. The print server 2 may execute the discarding urging processing on all users having history information of use of sheets in the image forming system or may executes the discarding urging processing on all users who use sheets (users having usage ratios equal to or higher than 1%).

Figure 18:
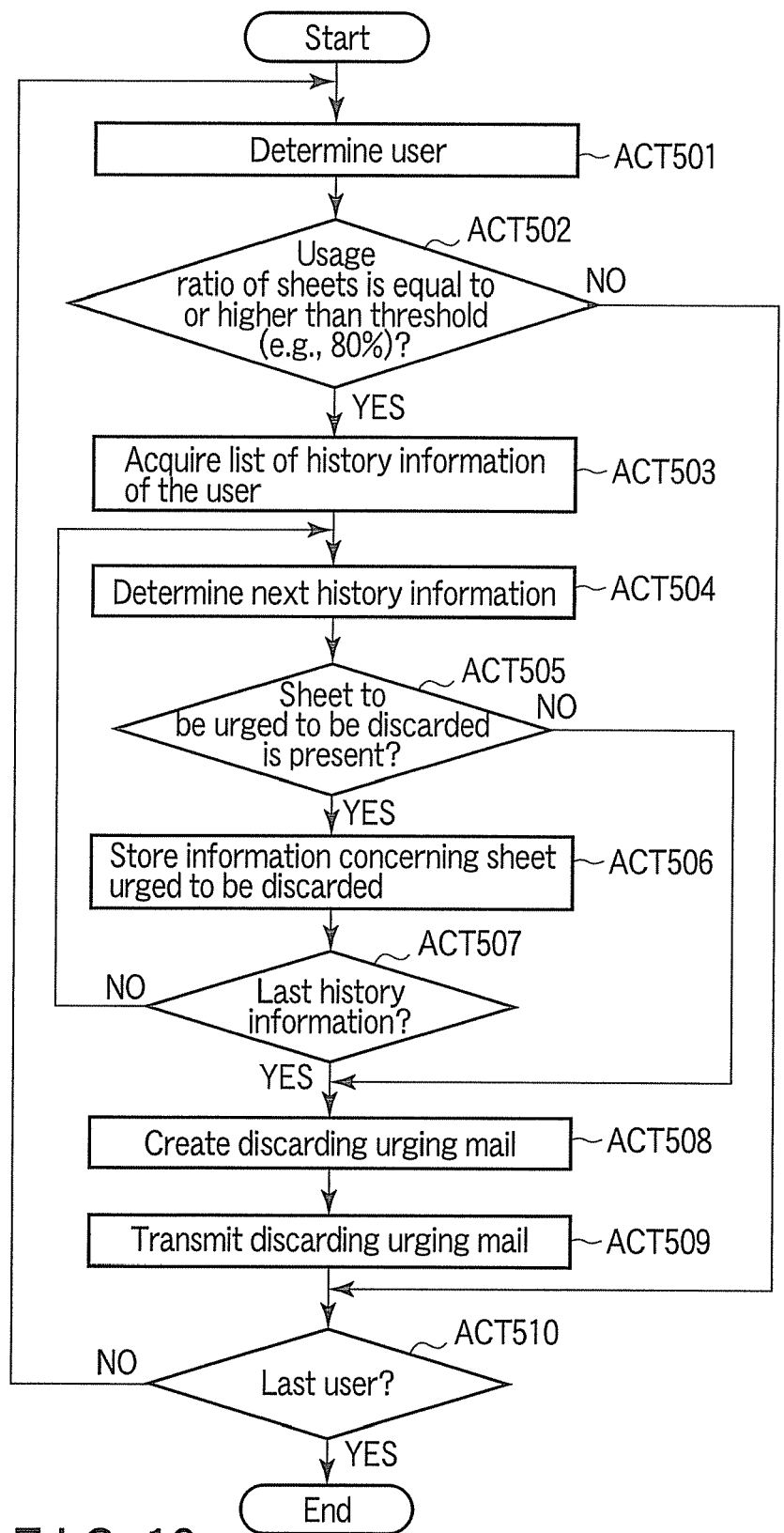
FIG. 18 is a flowchart for explaining an example of processing for transmitting a mail for requesting discarding of a sheet.

FIG. 18 is a flowchart for explaining an example of processing by the print server 2 for transmitting a mail for urging discarding of a sheet (the discarding urging processing).

The print server 2 performs the processing for transmitting a mail for urging discarding of a sheet to a user having a high usage ratio (the discarding urging processing) periodically (e.g., every day, every ten days, every week, or once a month). The print server 2 may perform the discarding urging processing according to an instruction by the administrator of the image forming system. In the discarding urging processing, the processor 21 checks a usage ratio of sheets for each user referring to the usage amount management table 24f.

The processor 21 determines a user whose usage ratio of sheets is checked (ACT 501). The processor 21 determines, referring to the used amount management table 24f, whether a usage ratio of sheets of the user is equal to or higher than a threshold for discard urging (e.g., 80%) (ACT 502).

If the usage ratio of sheets of the user is equal to or higher than the threshold (YES in ACT 502), the processor 21 checks, referring to the operation log table 24d, a sheet being used (not discarded) by the user. The processor 21 acquires a list of history information of the user from the operation log table 24d (ACT 503). The processor 21 determines history information to be checked from the acquired list (ACT 504). The processor 21 checks, for each piece of the history information, whether discarding of a sheet obtained as a print result (including a print result by copying) should be urged (ACT 505).

For example, the processor 21 may determine, on the basis of an expiration date of a printed image and present date and time, a sheet urged to be discarded (a sheet to be a discarding candidate). In this case, the processor 21 checks, according to the print management table 24c, a state of a discarding flag corresponding to a print ID included in the history information. If the discarding flag is in a state indicating that the sheet is not discarded, the processor 21 acquires, according to the page management table 24b, an expiration date for an image having a page ID corresponding to the print ID. The processor 21 determines whether a period until the expiration date acquired from the present date and time is within a period for discarding urging (e.g., before one week, before ten days, before one month, or before two months). If the period until the expiration date is within the period for discarding urging, the processor 21 determines that discarding of the sheet obtained as the print result indicated by the history information should be urged.

The processor 21 may determine, according to a confidentiality level of a printed image, a sheet that should be urged to be discarded. In this case, the processor 21 checks, according to the print management table 24c, a state of a discarding flag corresponding to the print ID included in the history information. If the discarding flag is in a state indicating that the sheet is not discarded, the processor 21 acquires, according to the page management table 24b, a confidentiality level for the image having the page ID corresponding to the print ID. The processor 21 determines whether the acquired confidentiality level is a level for discarding urging (e.g., equal to or lower than a confidentiality level "2"). If the confidentiality level is the level for discarding urging, the processor 21 determines that discarding of the sheet obtained as the print result indicated by the history information should be urged.

If the processor 21 determines, from the history information, the sheet that should be urged to be discarded, the processor 21 stores information concerning the sheet determined as being urged to be discarded (e.g., data and time when the sheet is printed, operation content, a file name, and a page number) in a memory such as the RAM 22 (ACT 505). The information concerning the sheet determined as being urged to be discarded is information concerning the sheet urged to be discarded described in a mail transmitted to the user. In other words, the processor 21 determines, according to a specification of the mail for urging discarding of a sheet transmitted to the user, information concerning the sheet urged to be discarded.

If the information concerning the sheet urged to be discarded is stored in the RAM 22 (ACT 504) or if the print result of the history information is not a sheet that should be urged to be discarded (NO in ACT 505), the processor 21 determines whether the checked history information is last history information (check of all pieces of history information for the user is completed) (ACT 507). If it is determined that the next history information that should be checked is present (NO in ACT 507), the processor 21 returns to ACT 504 and performs check for the next history information.

If the processor 21 determines that the check of all the pieces of history information for one user is completed (YES in ACT 507), the processor 21 creates a discarding urging mail transmitted to the user (ACT 508). The discarding urging mail is a mail for urging the user to discard a sheet. The processor 21 describes the information concerning the sheet determined as being urged to be discarded according to the expiration date or the confidentiality level.

FIG. 19 is a diagram of an example of a discarding urging mail.

In the example shown in FIG. 19, the discarding urging mail is a mail in which a user name, guidance for urging discarding of a sheet, a list of sheets to be discarding candidates that are sheets to be urged to be discarded, and the like are described. For example, the processor 21 creates, as the list of sheets to be discarding candidates, a list of sheets having images having close expiration dates printed thereon. In creating the list of sheets having the close expiration dates, the processor 21 accumulates, as information indicating a sheet to be a discarding candidate, history information indicating a sheet having a close expiration date (e.g., a sheet having an image having an expiration date within one month printed thereon) in the memory such as the RAM 22 according to the processing in ACT 506. The processor 21 creates a list of sheets to be discarding candidates in which sheets having images having close expiration dates printed thereon are arranged in order from one having a closest expiration date.

The processor 21 creates a list of sheets having images having low confidentiality levels printed thereon as a list of sheets to be discarding candidates. In creating the list of sheets having images having low confidentiality levels printed thereon as the list of sheets to be discarding candidates, the processor 21 extracts history information indicating the sheet having a low confidentiality level (e.g., the sheet having an image having a confidentiality level equal to or lower than "2" printed thereon), which is stored in the memory such as the RAM 22 in the processing in ACT 506, as information indicating a sheet to be a discarding candidate. The processor 21 creates a list of sheets to be discarding candidates in which sheets having images having low confidentiality levels printed thereon are arranged in order from one having a lowest confidentiality level.

The processor 21 may attach a thumbnail image of the image printed on the sheet urged to be discarded to the discarding urging mail. For example, the processor 21 can acquire, referring to the tables 24a to 24d, original data of a page printed on a sheet urged to be discarded and create a thumbnail image from the acquired original data.

After creating the discarding urging mail, the processor 21 transmits the created discarding urging mail to the user. The processor 21 acquires, from the user management server 3, a mail address of a user at a transmission destination to whom the discarding urging mail is transmitted. The mail address of the user may be stored in, for example, the HDD 24 of the print server 2.

If the discarding urging mail is transmitted (ACT 504) or if the usage ratio of sheets of the user is smaller than the threshold for discarding urging (YES in ACT 502), the processor 21 determines whether check of usage ratios of sheets for all users is completed (check of a usage ratio for the last user is completed) (ACT 510). If the processor 21 determines that the next user whose usage ratio of sheets should be checked is present (NO in ACT 510), the processor 21 returns to ACT 501 and performs check of a usage ratio for the next user. If the processor 21 determines that the check of the usage ratios of sheets for all the users is completed (YES in ACT 510), the processor 21 ends the discarding urging processing.

The processor 21 may output information concerning a sheet to be a discarding candidate selected by the discarding urging processing to the digital multifunction peripheral 1 as information displayed on the display unit 7a of the operation panel 7. For example, the processor 21 may output information indicating a list of sheets to be discarding candidates described in the discarding urging mail to the digital multifunction peripheral 1. When the digital multifunction peripheral 1 acquires the information indicating the list of sheets to be discarding candidates, the digital multifunction peripheral 1 can display, on the display unit 7a, a list of discarding candidates arranged in order from one having a closest expiration date or a list of discarding candidates arranged in order from one having a lowest confidentiality level as a list of the discarding candidates.

In the discarding urging processing, the processor 21 transmits the discarding urging mail for urging a user having a high usage ratio to discard a sheet. In the discarding urging processing, the processor 21 extracts, from the tables, information indicating a sheet that should be urged to be discarded such as a sheet having an image having a close expiration date printed thereon or a sheet having an image having a low confidentiality level printed thereon and describes the information indicating the sheet that should be urged to be discarded in the discarding urging mail. With the discarding urging processing, it is possible to urge the user having the high usage ratio to discard a sheet. It is possible to present information indicating a sheet to be a discarding candidate to the user.

The digital multifunction peripheral 1 may execute a part or all of the pieces of processing (ACTS 501 to 510) executed by the print server 2. The processing in ACTS 501 to 510 is a function that can be executed by a processor executing a computer program. Therefore, the processor 11 of the digital multifunction peripheral 1 can execute the processing in ACTS 501 to 510. If the processor 11 of the digital multifunction peripheral 1 executes the processing in ACTS 501 to 510, the digital multifunction peripheral 1 alone can realize the discarding urging processing.

Print limitation processing corresponding to a usage ratio of sheets is explained.

The print limitation processing corresponding to a usage ratio of sheets is processing by the print server 2 to limit printing of an image stepwise according to a usage ratio of sheets. For example, the print server 2 prohibits printing of an image having a confidentiality level corresponding to a usage ratio of sheets. The print server 2 stores plural thresholds for limiting output (printing) stepwise. The thresholds are threshold for a usage ratio of sheets. Print limitation by the print limitation processing can be executed for each user, each department, each floor, or an entire office. In the print limitation processing, print limitation can be performed according to a usage ratio of sheets of each user, a usage ratio of sheets of each department, a usage ratio of sheets of each floor, or a usage ratio of sheets of an entire office.

Figure 20:
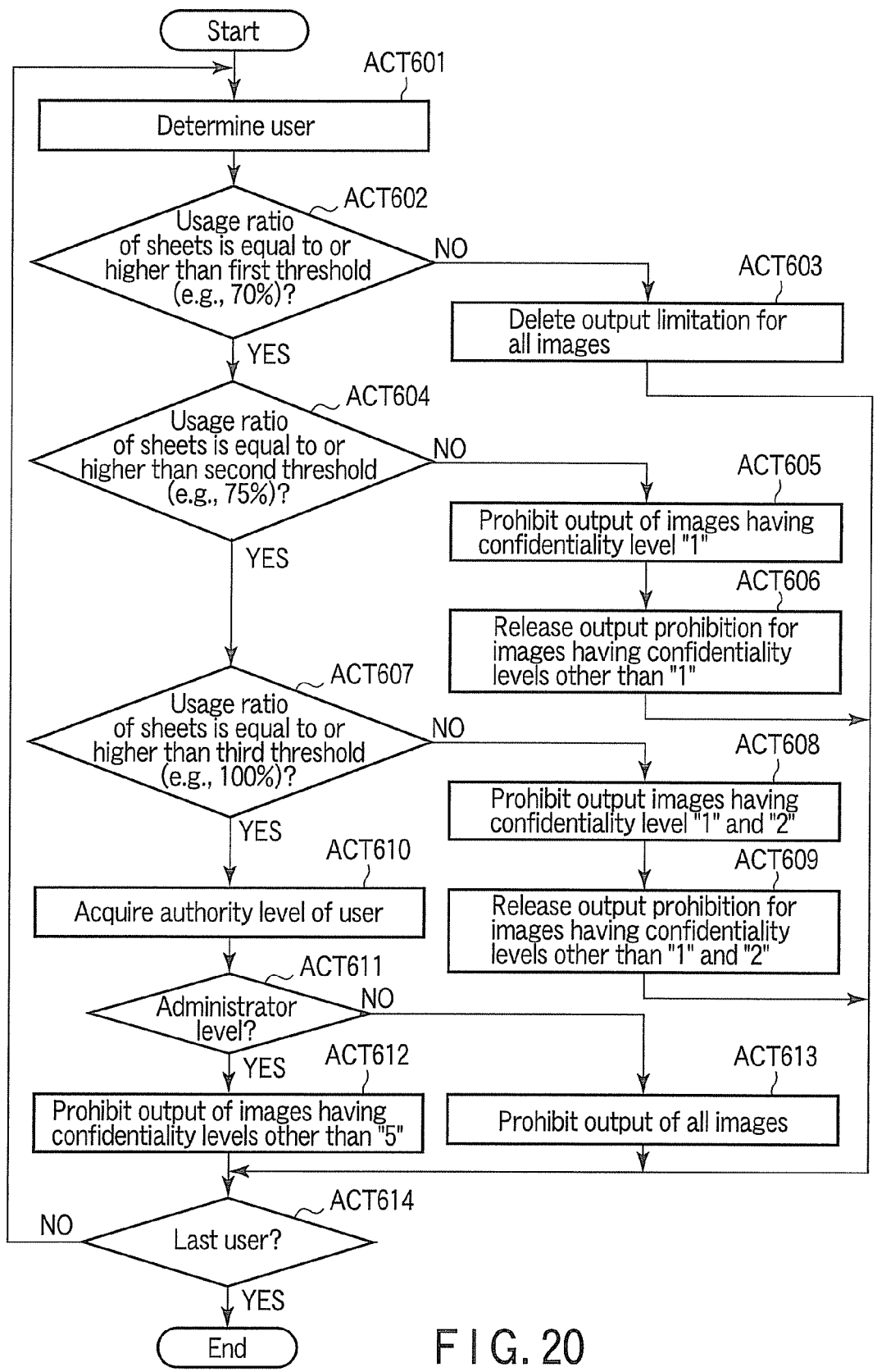
FIG. 20 is a flowchart for explaining an example of print limitation processing for limiting printing according to a usage ratio of sheets.

FIG. 20 is a flowchart for explaining an example of the print limitation processing for limiting, for each user, printing according to a usage ratio of sheets.

The print server 2 performs the print limitation processing corresponding to a usage ratio of sheets periodically (e.g., every day, every ten days, every week, or one in every month). The print server 2 may execute the print limitation processing, every time printing is executed, or according to an instruction of the administrator of the image forming system. In the example of the print limitation processing shown in FIG. 20, it is assumed that the processor 21 performs processing for limiting printing in confidentiality levels (e.g., "1" to "5") corresponding to usage ratios of sheets (print limitation processing) for the users.

The processor 21 determines a user whose usage ratio of sheets is checked (ACT 601). For example, the processor 21 sets users registered in the used amount management table 24f as a check target in order. After determining the user set as the check target, the processor 21 determines, referring to the used amount management table 24f, whether a usage ratio of sheets of the user is equal to or higher than a first threshold for print limitation (e.g., 70%) (ACT 602). If the usage ratio of sheets of the user is smaller than the first threshold for print limitation (NO in ACT 602), the processor 21 releases output (print) limitation for all images for the user (ACT 603) and proceeds to ACT 614.

For example, the processor 21 acquires a print ID of a sheet output (copied or printed) by the user from the operation log table 24d and sets output flags for all pages corresponding to the acquired print ID to "FALSE (an output permitted state)"

in the page management table 24b. As the print limitation processing for the users, the processor 21 may store information indicating that there is no print limitation in the used amount management table 24f in association with the user ID.

If the usage ratio of sheets of the user is equal to or higher than the first threshold for print limitation (YES in ACT 602), the processor 21 determines whether the usage ratio of sheets of the user is equal to or higher than a second threshold for print limitation (e.g. 75%) (ACT 604). It is assumed that the second threshold is larger than the first threshold. If the usage ratio of sheets of the user is equal to or higher than the first threshold for print limitation and smaller than the second threshold (NO in ACT 604), the processor 21 prohibits the user from outputting (printing) images, confidentiality levels of which are a first level (e.g., "1"), (ACT 605) and releases output prohibition for images, confidentiality levels of which are other than "1", (ACT 606).

For example, the processor 21 acquires a print ID of a sheet output (copied or printed) by the user from the operation log table 24d. The processor 21 sets output flags of pages, confidentiality levels of which are "1", among pages corresponding to the acquired print ID to "TRUE (an output prohibited state)" and sets output flags of pages, confidentiality levels of which are other than "1", to "FALSE (the output permitted state)" in the page management table 24b. As the print limitation processing for the users, the processor 21 may store information indicating a confidentiality level for print limitation (e.g., "1") in association with the user ID in the used amount management table 24f.

If the usage ratio of sheets of the user is equal to or higher than the second threshold for print limitation (YES in ACT 604), the processor 21 determines whether the usage ratio of sheets of the user is equal to or higher than a third threshold for print limitation (e.g., 100%) (ACT 607). It is assumed that the third threshold is larger than the second threshold. If the usage ratio of sheets of the user is equal to or larger than the second threshold for print limitation and smaller than the third threshold (NO in ACT 607), the processor 21 prohibits the user from outputting (printing) images, confidentiality levels of which are equal to or lower than a second level (e.g., "2"), (ACT 608) and releases output prohibition for images, confidentiality levels of which are other than a level equal to or lower than the second level (i.e., "1" or "2"), (ACT 609).

For example, the processor 21 acquires a print ID of a sheet output (copied or printed) by the user from the operation log table 24d. The processor 21 sets output flags of pages, confidentiality levels of which are "1" and "2" (equal to or lower than "2"), among pages corresponding to the acquired print ID to "TRUE (the output prohibited state)" and sets output flags of pages, confidentiality levels of which are other than "1" or "2", to "FALSE (the output permitted state)" in the page management table 24b. As the print limitation processing for the users, the processor 21 may store information indicating a confidentiality level for print limitation (e.g., equal to or smaller than "2") in the used amount management table 24f in association with the user ID.

If the usage ratio of sheets of the user is equal to or higher than the third threshold for print limitation (YES in ACT 607), the processor 21 acquires information indicating an authority level of the user (ACT 610). For example, the processor 21 inquires the user management server 3 about an authority level of the user and acquires information indicating the authority level of the user from the user management server 3. Authority levels of the users may be stored in the HDD 24 of the print server 2.

After acquiring the information indicating the authority level of the user, the processor 21 determines whether the authority level of the user is an administrator level (ACT 611). If the authority level of the user is the administrator level (YES in ACT 611), the processor 21 prohibits the user from outputting (printing) images, confidentiality levels of which are other than the third level (e.g., "5"), (ACT 612).

For example, the processor 21 acquires a print ID of a sheet output (copied or printed) by the user from the operation log table 24d. The processor 21 sets output flags of all pages, confidentiality levels of which are other than "5", among pages corresponding to the acquired print ID to "TRUE (the output prohibited state)" and sets output flags of pages, confidentiality level of which are "5", to "FALSE (the output permitted state)" in the page management table 24b. As the print limitation processing for the users, the processor 21 may store information indicating a confidentiality level for print limitation (e.g., other than "5") in the used amount management table 24f in association with the user ID.

If the authority level of the user is not the administrator level (NO in ACT 611), the processor 21 prohibits the user from outputting (printing) all images (ACT 613). For example, the processor 21 acquires a print ID of a sheet output (copied or printed) by the user from the operation log table 24d. The processor 21 sets output flags of all pages corresponding to the acquired print ID to "TRUE (the output prohibited state)" in the page management table 24b. As the print limitation processing for the users, the processor 21 may store indication that all pages are prohibited from being output in association with the user ID in the used amount management table 24f.

In the processing in ACTS 610 to 612, the processor 21 permits printing of only the images, the confidentiality levels of which are equal to or higher than "5", if the authority level of the user is the administrator level. With the processing in ACTS 610 to 612, even for a user having the usage ratio of sheets equal to or higher than the threshold for prohibiting printing of all images, it is possible to perform control for permitting only printing of images having high confidentiality levels according to an authority level. For example, the administrator can print an image having a confidentiality level set in advance (e.g., the confidentiality level "5") irrespective of a usage ratio of sheets.

The processing in ACTS 610 to 612 may be omitted. When the processing in ACTS 610 to 612 is omitted, if the usage ratio of sheets of the user is equal to or higher than the third threshold for print limitation (YES in ACT 607), the processor 21 prohibits the user from outputting (printing) all images irrespective of an authority level of the user (ACT 613).

When print limitation corresponding to a usage ratio of sheets is performed for the user, the processor 21 determines whether print limitation processing for all the users is completed (the print limitation processing for the last user is completed) (ACT 614). If the processor 21 determines that the next user for whom the print limitation processing corresponding to a usage ratio of sheets should be carried out is present (NO in ACT 614), the processor 21 returns to the ACT 601 and performs the print limitation processing for the next user. If the processor 21 determines that the print limitation processing for all the users is completed (YES in ACT 614), the processor 21 ends the print limitation processing.

In the print limitation processing, the processor limits printing according to a usage ratio. For example, the processor limits a printable image to an image having a higher confidentiality level as a usage ratio of sheets is higher. With the print limitation processing, when a usage ratio of sheets is high, it is possible to limit printing in order to suppress a user from printing an image. With the print limitation processing, it is possible to prevent an image having a higher confidentiality level from being printed as a usage ratio of sheets is higher.

In the print limitation processing, even if a confidentiality level is a level at which printing of all images should be prohibited, if a user is a person having an authority level equal to or higher than a specified level (e.g., the administrator), the processor 21 permits only printing of images having confidentiality levels (e.g., a highest confidentiality level "5") higher than a specified level. With the print limitation processing, the administrator can print an image having a high confidentiality level irrespective of a usage ratio of sheets.

The digital multifunction peripheral 1 may execute a part or all of the pieces of processing (ACTS 601 to 614) executed by the print server 2. The processing in ACTS 601 to 614 is a function that can be realized by a processor executing a computer program. Therefore, the processor 11 of the digital multifunction peripheral 1 can execute the processing in ACTS 601 to 614. If the processor 11 of the digital multifunction peripheral 1 executes the processing in ACTS 601 to 614, the digital multifunction peripheral 1 alone can realize the print limitation processing.

Calculation processing for the emission of carbon dioxide ($CO_2$) involved in discarding of a sheet is explained below.

The print server 2 has a function of calculating the emission of $CO_2$ from an amount of sheets discarded in a certain period (e.g., one month). The print server 2 has a function of outputting the calculated emission of $CO_2$ to an external system via a network. As the external system, for example, an eco system or the like for monitoring the emission of $CO_2$ in an entire office is assumed. The emission of $CO_2$ can be calculated for each user, each department, each floor, or each office (the entire image forming system). In this embodiment, calculation processing for the emission of $CO_2$ involved in discarding of sheets in the entire image forming system is explained.

Figure 21:
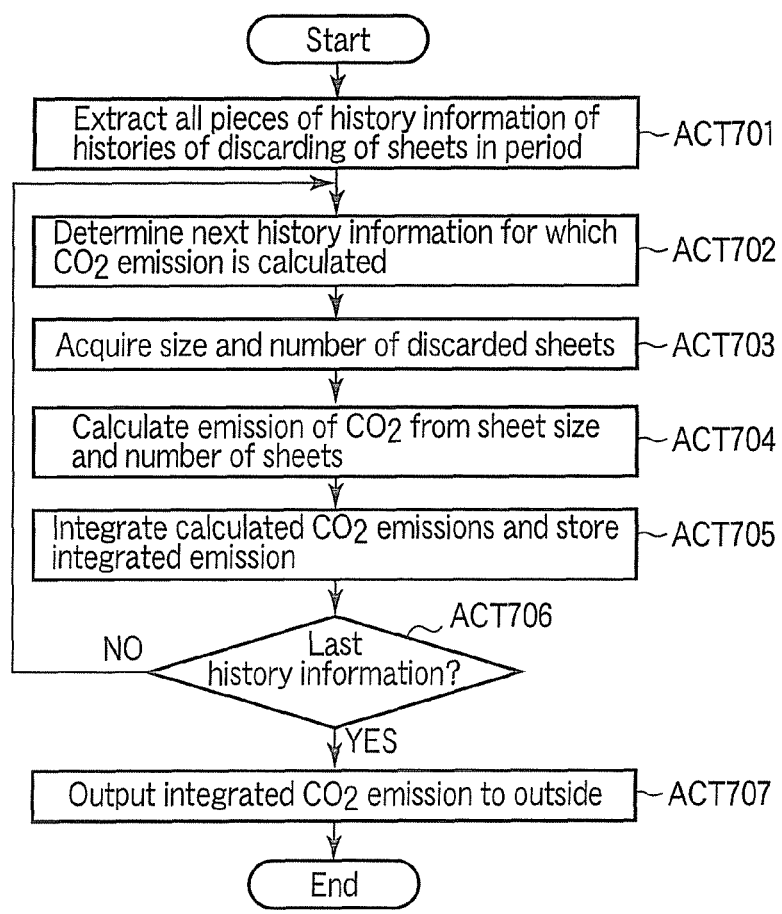
FIG. 21 is a flowchart for explaining calculation processing for $CO_2$ emission involved in discarding of sheets.

FIG. 21 is a flowchart for explaining calculation processing for $CO_2$ emission involved in discarding of sheets in the entire image forming system.

The print server 2 performs the calculation processing for $CO_2$ emission in every period in which the emission of $CO_2$ is calculated (e.g., every day, every ten days, every week, or once a month). The print server 2 may executes the calculation processing for $CO_2$ emission according to an instruction by the administrator of the image forming system. The print sever 2 can also calculate $CO_2$ emission in a period designated by the administrator. In the example of the calculation processing for $CO_2$ emission shown in FIG. 21, it is assumed that the processor 21 calculates the emission of $CO_2$ according to an amount of sheets discarded by all the users in one month.

The processor 21 of the print server 2 extracts all pieces of history information of discarding of sheets by all the users in a period (e.g. one month) from the operation log table 24d (ACT 701). The processor 21 calculates the emission of $CO_2$ from the history information in order (ACT 702). The processor 21 acquires a size and the number of discarded sheets from the history information set as a calculation target (ACT 703). The processor 21 calculates the emission of $CO_2$ according to the emission of $CO_2$ and the number of sheets corresponding to the size of the sheets (ACT 704). For example, it is said that an amount of carbon dioxide generated by burning 1 kg of sheets is 1.61 kg. The processor 21 integrates the emissions of $CO_2$ calculated from the history information and stores the integrated emission in the memory such as the RAM 22 (ACT 705).

The processor 21 executes the processing in ACTS 702 to 705 on the history information of the histories of discarding of sheets in one month (ACT 706). If the calculation of $CO_2$ emissions from all the pieces of history information of the histories of discarding of sheets in one month (YES in ACT 706), the processor 21 outputs a value obtained by integrating the $CO_2$ emissions calculated from the history information stored in the RAM 22 (the $CO_2$ emissions calculated from all the pieces of history information) to the external system (ACT 707). It is assumed that the external system includes an interface for data communication and is connected to the image forming system via a network.

A cause of the emission of $CO_2$ is not limited to the discarded sheets. A value obtained by converting energy necessary for printing an image on a sheet into $CO_2$ may be added. For example, to print an image on one sheet, electric power or energy of developing materials (toner, ink, etc.) are consumed. For example, an average of energy necessary for printing an image on one sheet can be set for each sheet size. If the average of the energy for each sheet size is converted into $CO_2$, the processor 21 can calculate, for each sheet size, an amount of $CO_2$ necessary for printing.

In the calculation processing for $CO_2$ emission, the processor 21 calculates $CO_2$ emission due to sheets discarded in a period from history information of discarding of the sheets in the period. The processor 21 notifies the calculated $CO_2$ emission to the external system as $CO_2$ emission caused by discarding of sheets in the image forming system. With the processing for calculation $CO_2$ emission, the external system can grasp $CO_2$ emission caused by discarding of sheets in the image forming system.

The digital multifunction peripheral 1 may execute a part or all of the pieces of processing (ACTS 701 to 707) executed by the print server 2. The processing in ACTS 701 to 707 is a function that can be realized by a processor executing a computer program. Therefore, the processor 11 of the digital multifunction peripheral 1 can execute the processing in ACTS 701 to 707. If the processor 11 of the digital multifunction peripheral 1 executes the processing in ACTS 701 to 707, the digital multifunction peripheral 1 alone can realize the calculation processing for $CO_2$ emission.

Adjustment processing for a discarded amount of sheets corresponding to total $CO_2$ emission is explained.

The print server 2 performs adjustment processing for adjusting a discarded amount of sheets according to total emission of $CO_2$ in an entire office or the like. For example, the print server 2 adjusts a discarded amount of sheets in the image forming system to fix total emission of $CO_2$ in an entire office (an entire area including the image forming system) including emission due to causes other than discarding of sheets such as power consumption. For example, it is assumed that an external eco system that can communicate with the print server 2 manages data indicating total emission of $CO_2$ (including emission due to causes such as power consumption) in one month in the entire office.

Figure 22:
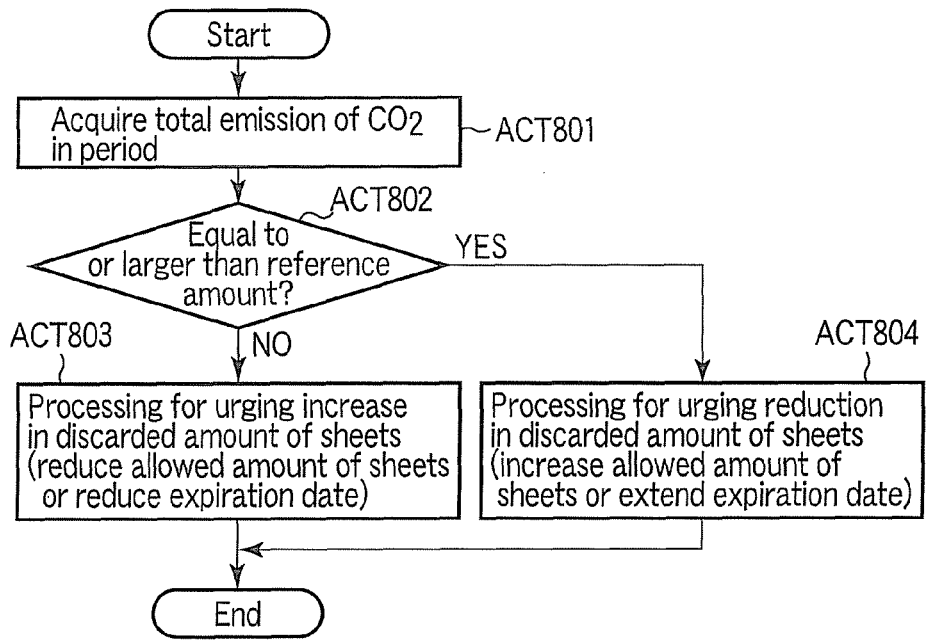
FIG. 22 is a flowchart for explaining adjustment processing for a discarded amount of sheets.

FIG. 22 is a flowchart for explaining the adjustment processing for a discarded amount of sheets in the image forming system.

The print server 2 performs the adjustment processing for a discarded amount of sheets in every period in which adjustment for a discarded amount of sheets is performed (e.g., every day, every ten days, every week, or once a month). The print server 2 may execute the adjustment processing for a discarded amount of sheets according to an instruction by the administrator of the image forming system. The print server 2 can also execute the adjustment processing for a discarded amount of sheets in a period designated by the administrator. In the example of the adjustment processing shown in FIG.

22, it is assumed that the processor 21 executes the adjustment processing for a discarded amount of sheets in every one month.

The processor 21 of the print server 2 acquires data indicating total emission of CO2 in one month in the entire office from the external eco system (ACT 801). The processor 21 compares the acquired total emission of CO2 and a reference value (ACT 802). For example, it is assumed that a reference value (a cap) of total emission of CO2 in one year is determined in the entire office. In this case, a reference value for each month can be determined by apportioning the reference value (the cap) of the total emission of CO2 in one year to twelve months.

If the total emission of CO2 acquired from the external eco system is smaller than the reference value (NO in ACT 802), the processor 21 executes processing for urging an increase in a discarded amount of sheets in the image forming system (urging processing for an increase of a discarded amount) (ACT 803).

For example, as the urging processing for an increase in a discarded amount, the processor 21 lowers allowed amounts of sheets of the users (e.g., allowed amounts of sheets of all the users by 5%). If the allowed amount of sheets decreases, discarding of sheets by the users is urged. The processor 21 may determine a reduction in the allowed amount of sheets from a value of a difference between the acquired total emission of CO2 and the reference value.

As the urging processing for an increase in a discarded amount, the processor 21 may reduce an expiration date of an image printed on a sheet (e.g., reduce an expiration date of two months by one month). If the expiration date is reduced, discarding of sheets by the users is urged. The processor 21 may determine the length of a period for reducing the expiration date from the value of the difference between the acquired total emission of CO2 and the reference value.

If the total emission of CO2 acquired from the external eco system is equal to or larger than the reference value (YES in ACT 802), the processor 21 executes processing for urging a reduction in a discarded amount of sheets in the image forming system (urging processing for a reduction in a discarded amount) (ACT 804).

For example, as the urging processing for a reduction in a discarded amount, the processor 21 increases allowed amounts of sheets of the users (e.g., increases allowed amounts of sheets of all the users by 5%). If the allowed amount of sheets increases, delay in discarding of sheets by the users is urged. The processor 21 may determine an increase amount in the allowed amount of sheets from the value of the difference between the acquired total emission of CO2 and the reference value.

As the urging processing for a reduction in a discarded amount, the processor 21 may extend an expiration date of an image printed on a sheet (e.g., an expiration date within one month is extended by one month). If the expiration date is extended, delay in discarding of sheets by the users is urged. The processor 21 may determine the length of a period for extending the expiration date from the value of the difference between the acquired total emission of CO2 and the reference value.

In the adjustment processing, the processor 21 acquires total emission of CO2 due to power consumption or the like from the external system. If the total emission of CO2 is equal to or larger than the reference value, the processor 21 executes the processing for urging a reduction in a discarded amount of sheets. If the total emission of CO2 is smaller than the reference value, the processor 21 executes the processing for urging an increase in a discarded amount of sheets. With the adjustment processing, it is possible to bring the total emission of CO2 close to the reference value by discarding sheets in the image forming system.

The digital multifunction peripheral 1 may execute a part or all of the pieces of processing (ACTS 801 to 804) executed by the print server 2. The processing in ACTS 801 to 804 is a function that can be realized by a processor executing a computer program. Therefore, the processor 11 of the digital multifunction peripheral 1 can execute the processing in ACTS 801 to 804. If the processor 11 of the digital multifunction peripheral 1 executes the processing in ACTS 801 to 804, the digital multifunction peripheral 1 alone can realize the adjustment processing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printing managing apparatus, the apparatus comprising:
   a log memory configured to store, in association with user identification information, information indicating a sheet printed by an image forming apparatus according to an instruction of a user or information indicating a sheet discarded by the user;
   an allowed amount memory configured to store allowed amounts of sheets usable by users;
   a counting unit configured to count a number of un-discarded sheets among sheets printed by a certain user stored by the log memory;
   a calculating unit configured to calculate a usage ratio of sheets from the number of un-discarded sheets counted by the counting unit and the allowed amount of sheets for the user stored by the allowed amount memory; and
   an output unit configured to output information including the usage ratio of sheets calculated by the calculating unit.

2. The apparatus according to claim 1, further comprising an acquiring unit configured to acquire user information for authentication from the user, wherein
   the output unit outputs, when user authentication by the user information acquired by the acquiring unit is successful, display data for causing a display device to display a usage ratio of sheets of the user who succeeds in the authentication.

3. The apparatus according to claim 1, further comprising:
   an image management memory configured to store expiration dates for images printed on sheets; and
   a selecting unit configured to select, as discarding candidates, sheets having printed thereon images having the expiration dates within a reference period out of sheets not discarded by the user, the usage ratio of sheets of which exceeds a reference value, wherein
   the output unit outputs information including a list of discarding candidates in which the discarding candidates selected by the selecting unit are arranged in order from one having a closest expiration date of an image.

4. The apparatus according to claim 3, further comprising a creating unit configured to create a mail in which the list of discarding candidates in which the discarding candidates selected by the selecting unit are arranged in order from one having a closest expiration date of an image is described, wherein the output unit transmits the mail created by the creating unit to the user.

5. The apparatus according to claim 1, further comprising:
an image management memory configured to store confidentiality levels of images printed on sheets; and
a selecting unit configured to select, as discarding candidates, sheets having printed thereon images having the confidentiality levels equal to or lower than a reference level out of sheets not discarded by the user, the usage ratio of sheets of which exceeds a reference value, wherein
the output unit outputs information including a list of discarding candidates in which the discarding candidates selected by the selecting unit are arranged in order from one having a lowest confidentiality level of an image.

6. The apparatus according to claim 5, further comprising a creating unit configured to create a mail in which the list of discarding candidates in which the discarding candidates selected by the selecting unit are arranged in order from one having a lowest confidentiality level of an image is described, wherein
the output unit transmits the mail created by the creating unit to the user.

7. The apparatus according to claim 1, further comprising:
an image management memory configured to store confidentiality levels of images printed on sheets; and
a print limiting unit configured to prohibit the users from printing images having confidentiality levels corresponding to usage ratio of sheets.

8. The apparatus according to claim 7, wherein the print limiting unit prohibits a user having the usage ratio of sheets equal to or higher than the first threshold from printing images having the confidentiality levels equal to or lower than a first level.

9. The apparatus according to claim 1, further comprising:
an extracting unit configured to extract information concerning sheets discarded within a period from the log memory;
a converting unit configured to calculate an amount of the sheets discarded within the period from the information concerning the discarded sheets extracted by the extracting unit and convert the calculated amount of the sheets into emission of carbon dioxide; and
a notifying unit configured to notify an external system of the emission of carbon dioxide due to the discarded sheets converted by the converting unit.

10. The apparatus according to claim 1, further comprising:
an acquiring unit configured to acquire information indicating total emission of carbon dioxide from an external system; and
a processing unit configured to execute, if the total emission of carbon dioxide acquired by the acquiring unit is equal to or larger than a reference value, processing for urging a reduction in a discarded amount of sheets and execute, if the total emission of carbon dioxide acquired by the acquiring unit is smaller than the reference value, processing for urging an increase in the discarded amount of sheets.

11. An image forming apparatus comprising:
an image forming unit configured to form an image on a sheet according to an instruction of a user;
a log memory configured to store, in association with user identification information, information indicating the sheet printed by the image forming unit or information indicating a sheet discarded by the user;
an allowed amount memory configured to store allowed amounts of sheets usable by users;
a counting unit configured to count a number of un-discarded sheets among sheets printed by a certain user stored by the log memory;
a calculating unit configured to calculate a usage ratio of sheets from the number of un-discarded sheets counted by the counting unit and the allowed amount of sheets for the user stored by the allowed amount memory; and
a display unit configured to display information including the usage ratio of sheets calculated by the calculating unit.

12. A printing managing method comprising:
storing, in association with user identification information, information indicating a sheet printed by the image forming apparatus according to an instruction of a user or information indicating a sheet discarded by the user;
counting a number of un-discarded sheets among sheets printed by a certain user;
calculating a usage ratio of sheets of the user from the counted number of un-discarded sheets and the allowed amount of sheets for the user stored in a memory; and
outputting information including the calculated usage ratio of sheets.

13. The method according to claim 12, further comprising:
acquiring user information for authentication from the user, wherein
the outputting includes outputting, when user authentication by the acquired user information is successful, display data for causing a display device to display a usage ratio of sheets of the user who succeeds in the authentication.

14. The method according to claim 12, further comprising:
storing expiration dates for images printed on sheets; and
selecting, as discarding candidates, sheets having printed thereon images having the expiration dates within a reference period out of sheets not discarded by the user, the usage ratio of sheets of which exceeds a reference value, wherein
the outputting includes outputting information including a list of discarding candidates in which the selected discarding candidates are arranged in order from one having a closest expiration date of an image.

15. The method according to claim 14, further comprising creating a mail in which the list of discarding candidates in which the selected discarding candidates are arranged in order from one having a closest expiration date of an image is described, wherein
the outputting includes transmitting the created mail to the user.

16. The method according to claim 12, further comprising:
storing confidentiality levels of images printed on sheets; and
selecting, as discarding candidates, sheets having printed thereon images having the confidentiality levels equal to or lower than a reference level out of sheets not discarded by the user, the usage ratio of sheets of which exceeds a reference value, wherein
the outputting includes outputting information including a list of discarding candidates in which the selected discarding candidates are arranged in order from one having a lowest confidentiality level of an image.

17. The method according to claim 16, further comprising creating a mail in which the list of discarding candidates in which the selected discarding candidates are arranged in order from one having a lowest confidentiality level of an image is described, wherein the outputting includes transmitting the created mail to the user.

18. The method according to claim 12, further comprising:

storing confidentiality levels of images printed on sheets; and prohibiting the users from printing images having confidentiality levels corresponding to usage ratios of sheets.

19. The method according to claim 12, further comprising:

extracting information concerning sheets discarded within a period from the log memory;

calculating an amount of the sheets discarded within the period from the extracted information concerning the discarded sheets and converting the calculated amount of the sheets into emission of carbon dioxide; and notifying an external system of the converted emission of carbon dioxide due to the discarded sheets.

20. The method according to claim 12, further comprising:

acquiring information indicating total emission of carbon dioxide from an external system; and executing, if the acquired total emission of carbon dioxide is equal to or larger than a reference value, processing for urging a reduction in a discarded amount of sheets and executing, if the acquired total emission of carbon dioxide is smaller than the reference value, processing for urging an increase in the discarded amount of sheets.

* * * * *